United States Patent [19]

Asai et al.

[11] Patent Number: 5,886,893
[45] Date of Patent: Mar. 23, 1999

[54] PORTABLE POWER UNIT USING A CYCLOCONVERTER FOR GENERATING A HIGH POWER SINGLE-PHASE ALTERNATING CURRENT

[75] Inventors: Koichi Asai, Nerimaku; Motohiro Shimizu, Kawagae, both of Japan

[73] Assignee: Honda Giken Kogyo Kabushiki Kaisha, Tokyo, Japan

[21] Appl. No.: 882,683

[22] Filed: Jun. 25, 1997

[30] Foreign Application Priority Data

Aug. 1, 1996 [JP] Japan .................................. 8-218139
Aug. 1, 1996 [JP] Japan .................................. 8-218140
Aug. 1, 1996 [JP] Japan .................................. 8-218141

[51] Int. Cl.$^6$ .................................................. H02M 5/257
[52] U.S. Cl. ........................................ 363/161; 363/65
[58] Field of Search .............................. 123/651, 149 D; 310/153, 26; 323/201; 363/96, 98, 136, 161, 65

[56] References Cited

U.S. PATENT DOCUMENTS 3,654,541 4/1972 Kelly, Jr. et al. ...................... 363/161
4,084,220 4/1978 Akamatsu ................................ 363/37

FOREIGN PATENT DOCUMENTS 60-9429 3/1985 Japan .
4-355672 12/1992 Japan .
7-67229 7/1995 Japan .

Primary Examiner—Shawn Riley
Attorney, Agent, or Firm—Frishauf, Holtz, Goodman, Langer & Chick

[57] ABSTRACT

A portable power unit has a magneto generator having three-phase output windings. A synchronizing signal is formed in synchronism with an output frequency of the magneto generator. A pair of variable control bridge circuits are connected to the three-phase output windings and connected in antiparallel connection to each other to form a cycloconverter for generating a single-phase alternating current having a desired frequency to be supplied to a load. A bridge drive circuit is responsive to the synchronizing signal from the synchronizing signal-forming circuit, for causing the pair of variable control bridge circuits to be alternately switched to operate every half a repetition period of the single-phase alternating current, to thereby cause the cycloconverter to generate the single-phase alternating current. An output voltage-detecting circuit detects an output voltage of the pair of variable control bridge circuits. An output voltage-adjusting circuit compares the output voltage detected by the output voltage-detecting circuit with a desired voltage to thereby control the bridge drive circuit in a manner such that the output voltage of the pair of variable control bridge circuits is maintained substantially at a fixed value.

11 Claims, 16 Drawing Sheets

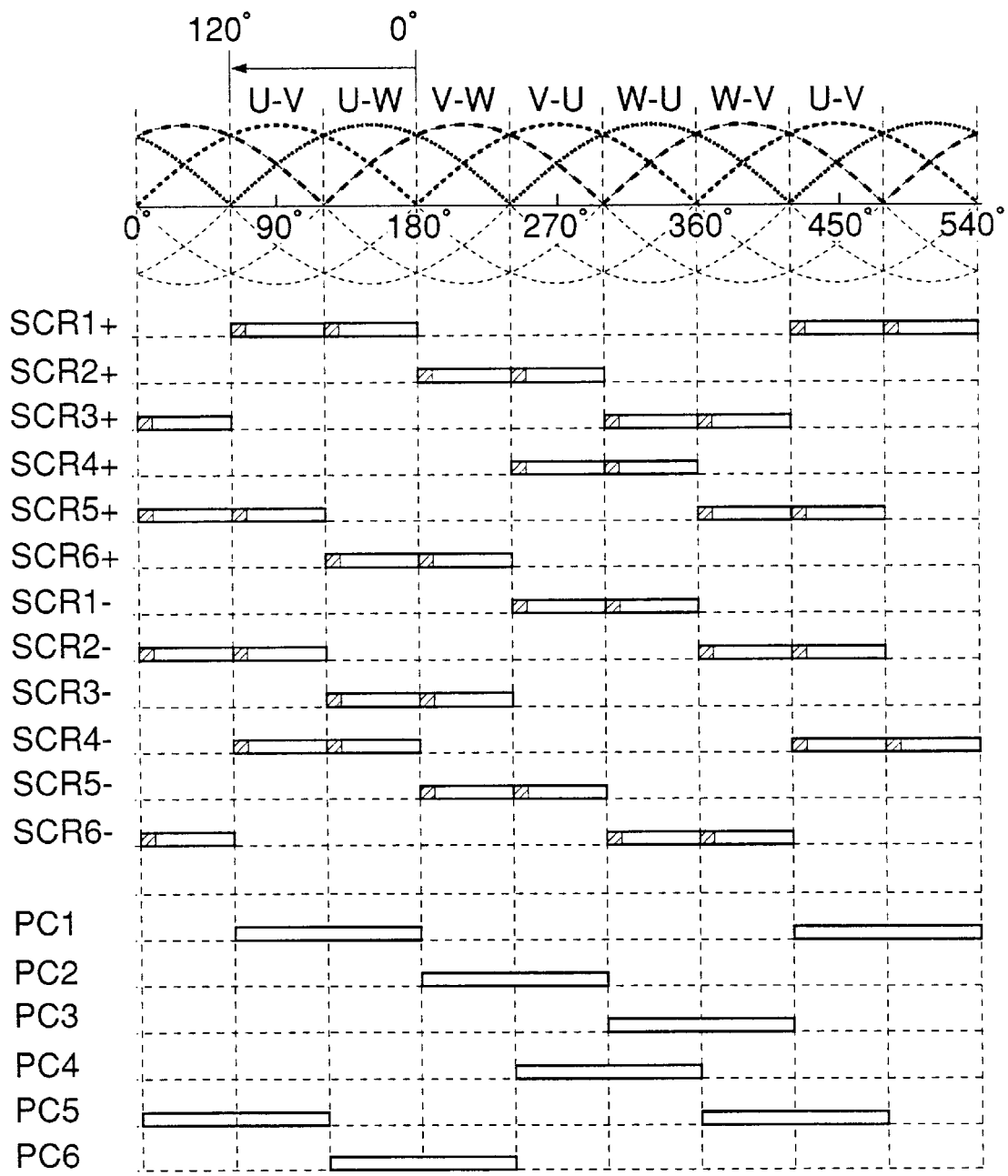

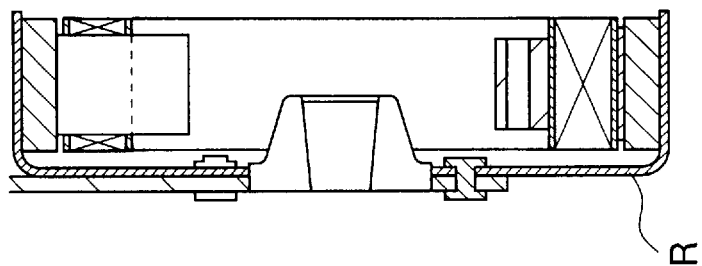
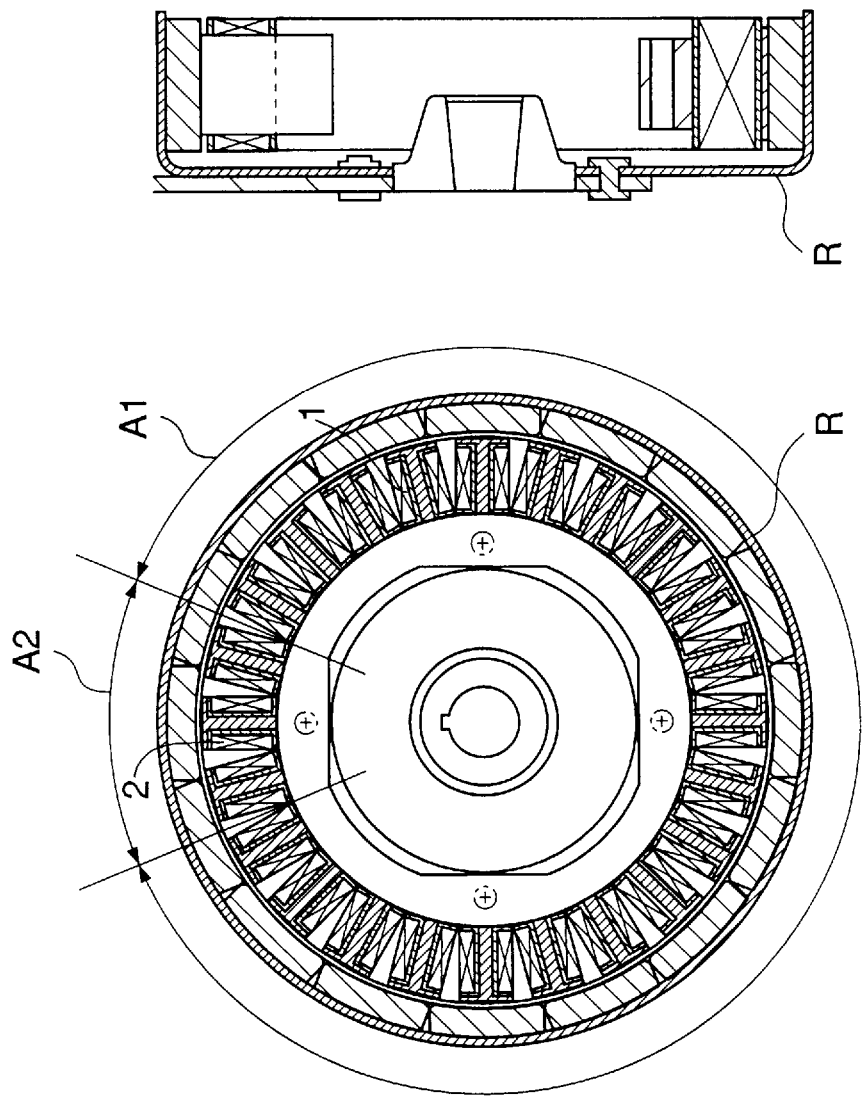

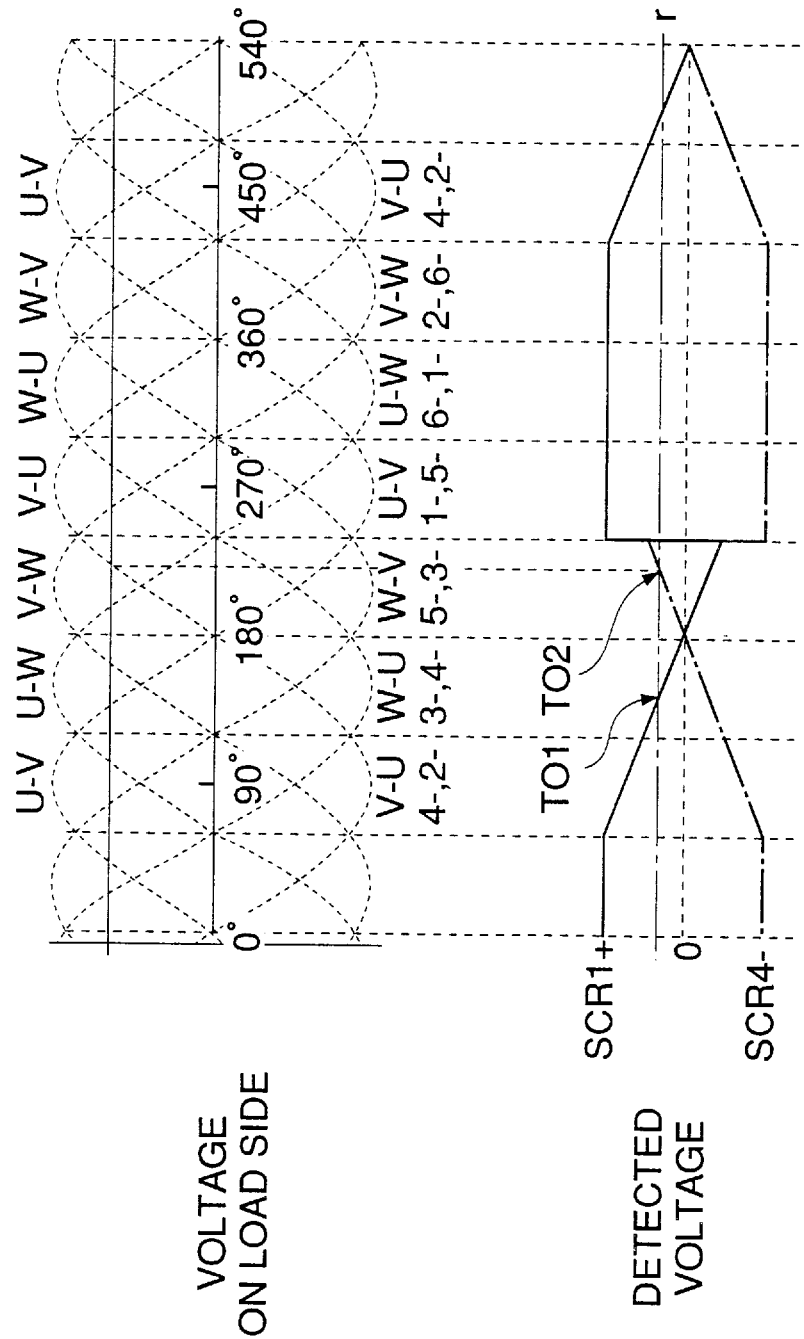

PORTABLE POWER UNIT USING A CYCLOCONVERTER FOR GENERATING A HIGH POWER SINGLE-PHASE ALTERNATING CURRENT

BACKGROUND OF THE INVENTION

1. Field of the Invention

This invention relates to a portable power unit which generates a single-phase AC power having a commercial frequency or a like frequency, and more particularly to a portable power unit of this kind which uses a cycloconverter.

2. Prior Art

Conventionally, a portable power unit which is a combination of a small-sized engine and a synchronous generator, for instance, is widely used for emergency purposes, outdoor works, leisure time amusement, etc.

In this type of conventional portable power unit, however, the output frequency depends on the rotational speed of the engine. Therefore, in the case of a bipolar generator, to obtain an AC output of 50 Hz (or 60 Hz), the rotational speed of the engine is required to be held at 3000 rpm (or 3600 rpm), i.e. a relatively low rotational speed, which degrades the operating efficiency of the power unit, and further, necessitates designing the generator to be large in size, resulting in an increased total weight of the power unit.

To overcome this inconvenience, a so-called inverter generator has been proposed by the present assignee, e.g. in Japanese Patent Publication (Kokoku) No. 7-67229 and Japanese Laid-Open Patent Publication (Kokoku) No. 4-355672, in which an engine is operated at a relatively high rotational speed, to obtain a high AC power from a generator, and the AC power is once converted to direct current, and then to alternating current having a commercial frequency by an inverter.

The conventional inverter generator, however, requires provision of two power conversion blocks, i.e. an AC-to-DC conversion block for once converting the AC power to DC power, and a DC-to-AC conversion block for converting the DC power to AC power having a predetermined frequency, as well as a circuit for temporarily storing the DC power. Thus, the use of a lot of expensive power circuit components is necessitated. This makes it difficult to reduce the size of the generator and leads to an increased manufacturing cost.

On the other hand, a so-called cycloconverter is conventionally known, which directly converts AC power with a fixed frequency to AC power with another frequency. The cycloconverter is employed in power plants.

The conventional cycloconverter is normally used for converting power supplied from a commercial frequency power line or power generated by a high power generator (see Japanese Patent Publication (Kokoku) No. 60-9429, for instance), and it is generally used for driving an AC electric motor.

The operating principle of the cycloconverter will be described with reference to FIGS. 1 to 6.

FIG. 1 is a circuit diagram showing an example of the construction of the conventional cycloconverter.

As shown in the figure, this cycloconverter CC is comprised of twelve thyristors SCRk± (k=1, 2, . . . , 6), with six thyristors SCRk+ thereof forming a bridge circuit (hereinafter referred to as "the positive converter") BC1 for delivering positive electric current, and the remaining six thyristors SCRk− thereof forming another bridge circuit (hereinafter referred to as "the negative converter") BC2 for delivering negative electric current. In other words, the two bridge circuits are connected in antiparallel connection to each other to form the cycloconverter.

When a three-phase generator with 27 poles (three of them are used to generate synchronizing signals for control of respective gates of the thyristors SCRk±), for instance, is connected to the cycloconverter CC, and driven by an internal combustion engine, nine cycles of three-phase alternating current are supplied to the cycloconverter per one revolution of the crankshaft of the engine. If the rotational speed of the engine is set to a range of 1200 rpm to 4500 rpm (equivalent to a frequency range of 20 Hz to 75 Hz), the frequency of the three-phase AC output from the generator is 180 Hz to 675 Hz, nine times as high as the rotational speed of the engine.

Components of the three-phase alternating current (i.e. U-phase current, V-phase current, and W-phase current) obtained from coils of the above-mentioned three poles (these coils will be hereinafter referred to as "the sub coils" and the coils of the remaining poles as "the main coils") are supplied to a three-phase full-wave bridge rectifier FR formed by primary light-emitting diodes (LED's) of respective six photocouplers PCk (k=1, 2, . . . , 6) and six diodes Dk (k=1, 2, . . . , 6), as shown in FIG. 2. Direct current components of the three-phase alternating current full-wave rectified by the three-phase full-wave rectifier FR are each transformed into light by a corresponding one of the primary light-emitting diodes, and then the light is converted into electric current by a corresponding one of secondary photosensors, not shown, associated with the primary light-emitting diodes of the photocouplers PCk. In short, electric currents corresponding to the three-phase alternating current components full-wave rectified by the three-phase full-wave rectifier FR are delivered from the secondary photosensors of the photocouplers. These electric currents are each used to form a synchronizing signal having e.g. a sawtooth waveform for controlling a phase control angle (firing angle) a of a gate of each of the thyristors SCRk±, as described in detail hereinafter.

FIG. 3 shows changes in line-to-line voltages appearing between respective pairs of the U, V, and W phases of the three-phase AC power and timing of "turn-on" of each photocoupler PCk.

Assuming that the line-to-line voltages (U-V, U-W, V-W, V-U, W-U, and W-V) change as shown in FIG. 3, the waveform of a full-wave rectified output from the three-phase full-wave rectifier FR has a repetition period of one sixth of that of the waveform of each line-to-line voltage obtained from the main coils. For example, when the U-V voltage is in a phase angle range of 60° to 120° where the U-V voltage is the highest of all the line-to-line voltages, the photocouplers PC1 and PC5 are turned on in pair (the other photocouplers are held off), whereby the three-phase full-wave rectifier circuit FR delivers electric current at a voltage corresponding to the U-V voltage. That is, the three-phase full-wave rectifier FR delivers electric current at a voltage corresponding to the maximum value of all the line-to-line voltages, so that the repetition period of the output voltage corresponds to a phase angle of 60°, and hence is equal to one sixth of the repetition period of the three-phase output voltage of the main coils, which corresponds to a phase angle of 360°.

FIG. 3 also shows a controllable range of timing of firing (turn-on) of the gate of each of the thyristors SCRk±, which is set to a phase angle range of 120° to 0° of a corresponding line-to-line voltage with two examples of timing of firing of each gate which are indicated by hatched portions (i.e. firing angles of 120° and 60°) described hereinafter.

According to this timing, each gate of the positive converter BC1 is fired (turned on) to deliver electric current therefrom, and each gate of the negative converter BC2 is turned on to absorb electric current thereto.

Needless to say, the gates are not required to be continuously held on over a selected portion of the controllable range, but the application of a predetermined pulse at timing indicated by the hatched portion (e.g. corresponding to one of the firing angles of 120° and 60°) enables the same operation as above to be performed.

FIGS. 4A to 4D shows examples of waveforms of the output of the cycloconverter obtained when the thyristors SCRk± of the positive and negative converters BC1 and BC2 are fired at respective firing angles of 120° and 60°.

FIG. 4A shows an output waveform of the cycloconverter CC obtained when each thyristor SCRk+ of the positive converter BC1 is turned on at a firing angle $\alpha$ of 120°, and FIG. 4B an output waveform of the same obtained when each thyristor SCRk– of the negative converter BC2 is turned on at a firing angle $\alpha$ of 120°. On the other hand, FIG. 4C shows an output waveform of the same obtained when each thyristor SCRk+ of the positive converter BC1 is turned on at a firing angle $\alpha$ of 60°, and FIG. 4D an output waveform of the cycloconverter CC obtained when each thyristor SCRk– of the negative converter BC2 is turned on at a firing angle $\alpha$ of 60°.

When each thyristor SCRk+ of the positive converter BC1 is turned on at the firing angle $\alpha$ of 120°, the output waveform of the cycloconverter CC presents a full-wave rectified current waveform as shown in FIG. 4A. When each thyristor SCRk+ of the positive converter BC1 is turned on at a firing angle $\alpha$ of 60°, the output waveform contains a lot of harmonic components as shown in FIG. 4C. These harmonic components, however, can be removed by a low-pass filter connected to the output side of the cycloconverter CC, so that electric current is output at an averaged voltage. As described hereinabove, assuming that the power supply to the cycloconverter is a three-phase generator having 27 poles, and the rotational speed of the engine is set to 3600 rpm, the frequency of a basic wave of the harmonic components is given by the following equation:

60 Hz (=3600 rpm)×9(-th harmonic)×3(phases)×2(half waves (=1 full wave))=3.24 kHz Further, by varying the firing angle $\alpha$ of each thyristor of the positive converter BC1 within a range of 0° to 120°, the cycloconverter CC is capable of generating a positive voltage as desired which has an average voltage within a range of 0 V to a positive full-wave rectified voltage. By varying the firing angle $\alpha$ of each thyristor of the negative converter BC2 in the same manner, the cycloconverter CC is capable of generating a negative voltage as desired which has an average voltage within a range of 0 V to a negative full-wave rectified voltage.

Next, the manner of varying the firing angle a within the range of 0° to 120° will be described.

FIG. 5 shows reference sawtooth waves generated for controlling the firing angle $\alpha$ of each thyristor of the cycloconverter. The reference sawtooth waves shown in the figure are generated based on respective electric currents detected by i.e. taken out from the secondary photosensors of the photocouplers.

A reference sawtooth wave for control of the thyristor SCR1+ of the positive converter BC1, for instance, is one which changes in voltage within a phase angle range of 120° to 0° and assumes 0 V at a phase angle of 0°. Reference sawtooth waves each having a phase difference of 60° from adjacent ones sequentially correspond to the thyristors SCRk+ , i.e. SCR1+, SCR6+, SCR2+, SCR4+, SCR3+, and SCR5+, respectively.

On the other hand, a reference sawtooth wave for control of the thyristor SCR1– of the negative converter BC2, for instance, is one which is symmetrical with the sawtooth wave for the thyristor SCR1+ with respect to a horizontal zero voltage line, i.e. which has a phase difference of 180° from the sawtooth wave for the thyristor SCR1+. Similarly to the positive converter BC1, reference sawtooth waves each having a phase difference of 60° from adjacent ones sequentially correspond to the thyristors SCRk–, i.e. SCR1–, SCR6–, SCR2–, SCR4–, SCR3–, and SCR5–, respectively.

Thus, the twelve sawtooth waves provide respective reference waveforms for control of the thyristors SCRk± of the positive and negative converters BC1, BC2. These sawtooth waves are compared with a desired waveform r by the use of comparators, not shown, provided in twelve channels, and a point of intersection of each sawtooth wave with the desired waveform (e.g. a point T0 in the case of the thyristor SCR1+) determines a firing angle of each corresponding thyristor SCRk±.

By employing a sinusoidal wave as the desired wave to thereby sinusoidally varying the firing angle $\alpha$, it is possible to obtain a sinusoidal output wave from the cycloconverter CC, as shown in FIG. 6. When a sinusoidal output wave of 50 Hz is obtained from the input waves each having a frequency of 540 Hz, for example, the output wave is fabricated from approximately 65 portions of the input sinusoidal waves connected one after another.

In the conventional power unit using the cycloconverter described above, the cycloconverter is not provided with means for storing energy. Therefore, when the cycloconverter is used to obtain single-phase sinusoidal alternating current, the energy input to the cycloconverter also sinusoidally changes.

Therefore, when a small-sized generator which generates small power e.g. of several hundreds to several thousands kW is connected to the input side of the cycloconverter to generate a single-phase sinusoidal wave, only portions of the input sinusoidal waves can be utilized as input energy, so that the utilization efficiency is very low, resulting in only a very small output power being taken out as single-phase alternating current.

Particularly, when a magneto generator is employed as the small-sized generator, if an electric motor as a load is connected to the power unit, the limited output power of the magneto generator can cause the power unit to become excessively loaded and inoperative due to even temporary large electric current which flows when the electric motor is started.

Further, in the conventional cycloconverter CC, when a small-sized generator which generates several hundreds to several thousands kW is connected to the output side of the cycloconverter, a large output voltage drop occurs when a heavy load is connected to the power unit, due to the limited power-generating capacity of the generator. The output voltage drop is particularly large when a magneto generator is employed as the generator, raising the following problem:

FIG. 7 shows voltages applied to the thyristors SCRk±, when a 230-volt alternating current output is obtained from the cycloconverter CC. In the figure, G designates a magneto generator used as the generator.

As mentioned above, the magneto generator has a load characteristic that the output voltage has a large drop relative to a load applied to the generator. Therefore, to obtain an AC 230 V output from the cycloconverter CC, the line-to-line voltage should exhibit a peak value as high as 600 Vp when the power unit is in a no-load condition. Assuming that the thyristors SCR1+ and SCR6+ are turned on in pair and the output voltage assumes a peak value of AC 230 V, as shown in the figure, the voltage Vscr applied to the thyristor SCR5+ can be calculated by the following equation:

$$Vscr = 230 \times \sqrt{2} \ Vp + 600 \ Vp = 920 \ V$$

In general, small-sized thyristors available have a withstand voltage of approximately 600 V at the maximum. Therefore, in conventional portable power units, so long as such small-sized thyristors are used, it is impossible to obtain AC 230 V power from the cycloconverter.

OBJECTS OF THE INVENTION

It is a first object of the invention to provide a portable power unit which is compact in size, light in weight, and low in manufacturing cost, which is capable of generating a relatively large power for its size.

It is a second object of the invention to provide a portable power unit which is capable of continuing its operation without difficulty even if it is temporarily excessively loaded when a generator having a small output power is connected to the input side of a cycloconverter thereof.

It is a third object of the invention to provide a portable power unit which employs a cycloconverter formed of small-sized thyristors which do not have high withstand voltages, but which is nevertheless capable of generating a large output when a generator having a small output power is connected to the input side of the cycloconverter.

BRIEF DESCRIPTION OF THE DRAWINGS

FIG. 3 is a timing chart showing changes in voltages appearing between a U phase, a V phase, and a W phase, timing of turn-on of each photocoupler, and timing of turn-on of a gate of each thyristor;

FIG. 9A is a transverse cross-sectional view of an AC generator appearing in FIG. 8;

FIG. 9B is a longitudinal cross-sectional view of the AC generator;

FIG. 11 is a diagram which is useful in explaining a problem to be solved when the firing angle is controlled in a range of 120° to −60°;

DETAILED DESCRIPTION

Next, the invention will be described with reference to drawings showing embodiments thereof.

Figure 8:
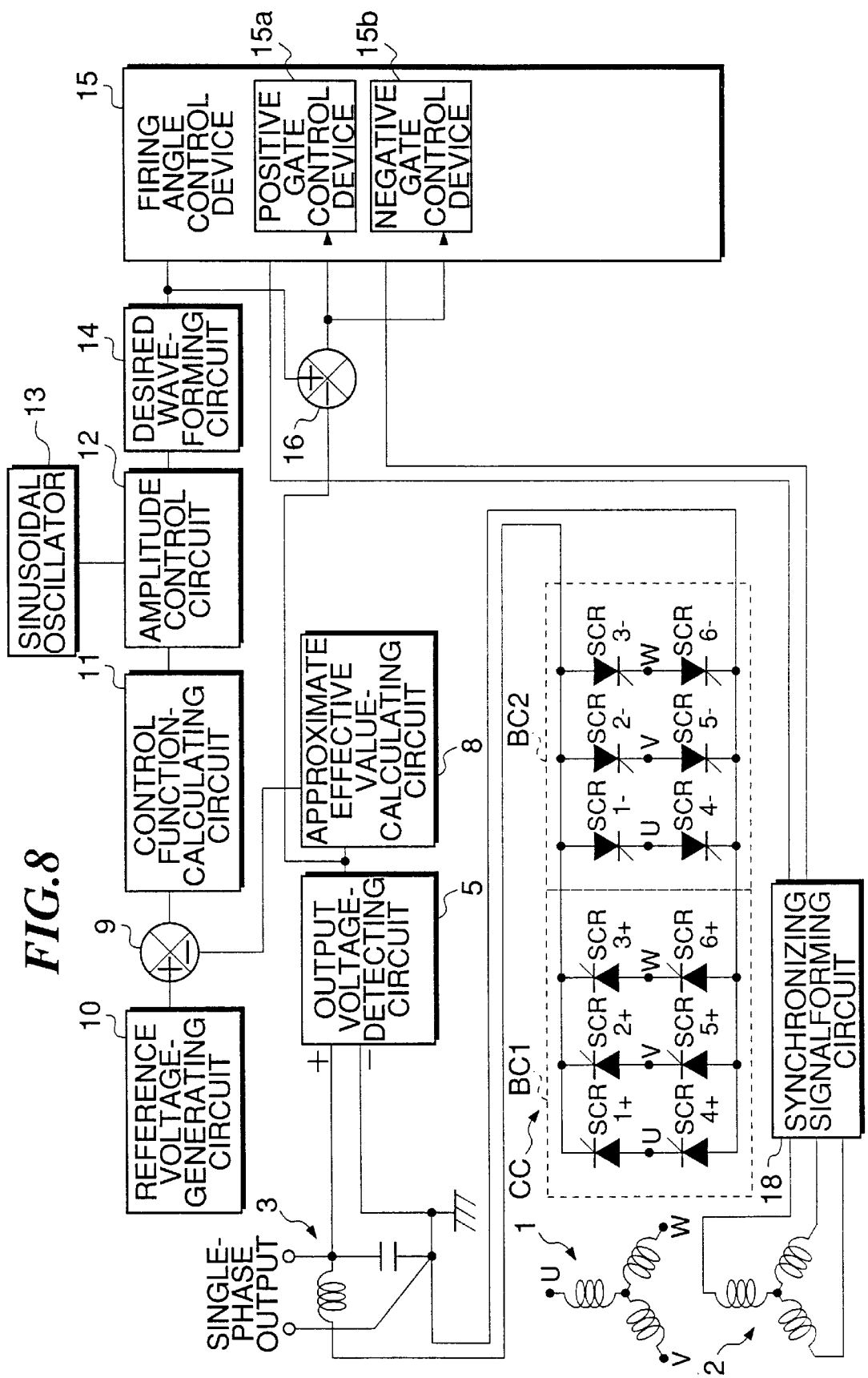
FIG. 8 is a block diagram schematically showing the whole arrangement of a power unit according to a first embodiment of the invention.

FIG. 8 shows the whole arrangement of a power unit including a control system therefor, according to an embodiment of the invention. In the figure, component parts and elements referred to hereinabove as the prior art with reference to FIGS. 1 to 7 are designated by the same reference numerals, and detailed description thereof is omitted.

In FIG. 8, reference numerals 1 and 2 designate output windings independently wound around a stator of an AC generator, i.e. three-phase main output windings (main coils), and three-phase auxiliary output windings (sub coils), respectively.

FIGS. 9A and 9B show the construction of the AC generator in longitudinal cross-section and transverse cross-section, respectively. The three-phase main coils 1 are formed by coils forming twenty-one poles within an area A1, and the three-phase sub coils 2 are formed by coils forming three poles within an area A2. A rotor R is formed with eight pairs of magnetic poles of permanent magnets, and driven for rotation by an internal combustion engine, not shown.

Referring again to FIG. 8, the three-phase main coils 1 have three output terminals U, V, and W which are connected to respective input terminals U, V and W of each of positive and negative converters BC1 and BC2 of a cycloconverter CC. The output side of the cycloconverter CC is connected to an LC filter 3 for removing harmonic components of electric current delivered from the cycloconverter CC. The output side of the LC filter 3 is connected to an output voltage-detecting circuit 5 for detecting a voltage of the electric current with the harmonic components removed. The output voltage-detecting circuit 5 has a positive input terminal thereof connected to the filter 3 and a negative input terminal thereof connected to a ground GND of the control system of the power unit whereby a single-phase output is obtained from the positive and negative input terminals of the output voltage-detecting circuit 5.

The output voltage-detecting circuit 5 has an output side thereof connected to an approximate effective value-calculating circuit 8 for calculating an approximate effective value of the output voltage from the circuit 5. The circuit 8 has an output side thereof connected to a negative input terminal of a comparator 9. Connected to a positive input terminal of the comparator 9 is a reference voltage-generating circuit 10 for generating a reference voltage value for the power unit. The comparator 9 has an output side thereof connected to a control function-calculating circuit 11 which calculates a control function, such as a linear function, based on results of the comparison by the comparator 9.

The control function-calculating circuit 11 has an output side thereof connected to an amplitude control circuit 12 which controls the amplitude of a sinusoidal wave having a commercial frequency of 50 Hz or 60 Hz delivered from a sinusoidal oscillator 13 connected thereto. That is, the amplitude control circuit 12 delivers an amplitude control signal generated based on the amplitude of the sinusoidal wave delivered from the sinusoidal oscillator 13 in response to the control function delivered from the control function-calculating circuit 11.

The amplitude control circuit 12 has an output side thereof connected to a desired wave-forming circuit 14 which generates a desired wave in response to the amplitude control signal from the circuit 12. The desired wave-forming circuit 14 has an output side thereof connected to a firing angle control device 15 for controlling the firing angle of a gate of each of the thyristors SCRk± constituting the cycloconverter CC, as well as to a positive input terminal of a comparator 16.

The firing angle control device 15 is comprised of a positive gate control device 15a for controlling the firing angles of gates of the thyristors SCRk+ of the positive converter BC1 (hereinafter referred to as "the positive gates") and a negative gate control device 15b for controlling the firing angles of gates of the thyristors SCRk− of the negative converter BC2 (hereinafter referred to as "the negative gates").

The positive and negative gate control devices 15a, 15b each have six comparators, not shown, each of which compares the desired wave with a synchronizing signal (reference sawtooth wave), referred to hereinafter, as described hereinbefore with respect to the prior art (FIG. 5), and fires a corresponding gate when the two waves agree with each other The comparator 16 has a negative input terminal thereof connected to the output side of the output voltage-detecting circuit 5 and an output terminal thereof connected to the positive gate control device 15a and the negative gate control device 15b. The comparator 16 compares the voltage delivered from the output voltage-detecting circuit 5 with the desired wave, and selectively delivers a high (H) level signal and a low (L) level signal depending upon results of the comparison.

When the H level signal is delivered from the comparator 16, the positive gate control device 15a is enabled while the negative gate control device 15b is disabled. On the other hand, when the L level signal is delivered from the same, the positive gate control device 15a is disabled while the negative gate control device 15b is enabled.

Figure 1:
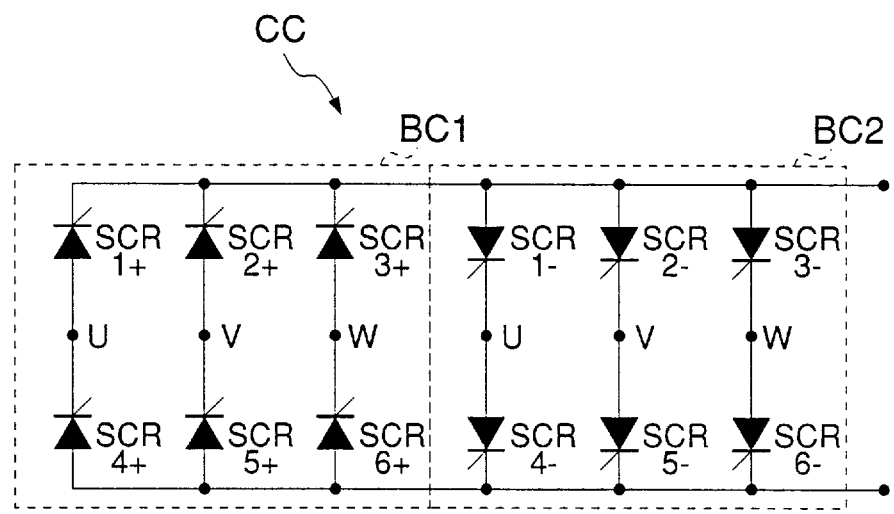
FIG. 1 is a circuit diagram showing the construction of a conventional cycloconverter.
Figure 2:
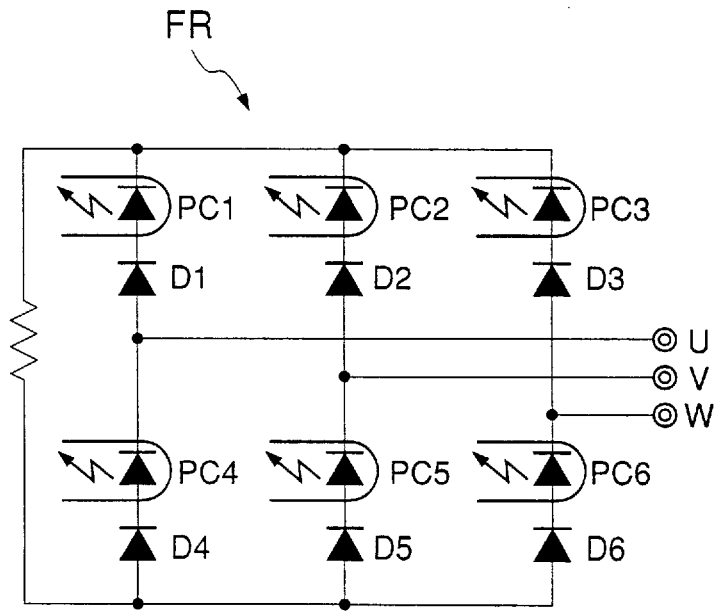
FIG. 2 is a circuit diagram showing the construction of a three-phase full-wave bridge rectifier.
Figure 4A:
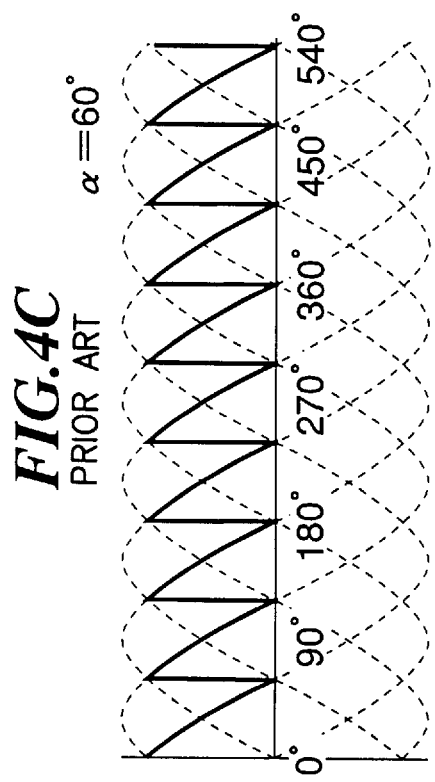
FIG. 4A is a diagram showing an output waveform of a positive converter exhibited when each thyristor thereof is fired at a firing angle of 120°.
Figure 4B:
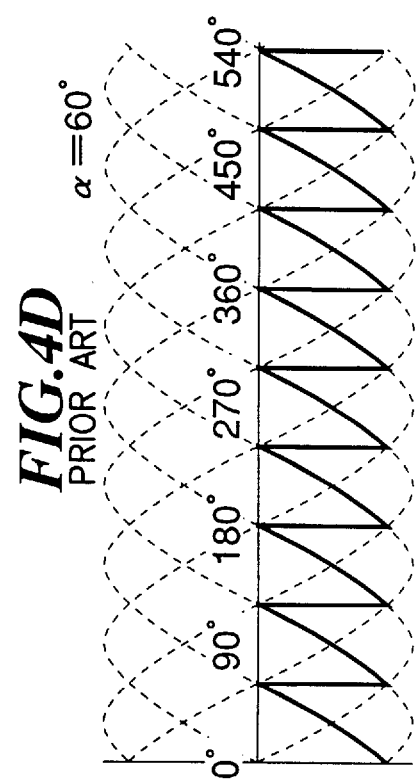
FIG. 4B is a diagram showing an output waveform of the positive converter exhibited when each thyristor thereof is fired at a firing angle of 60°.
Figure 4C:
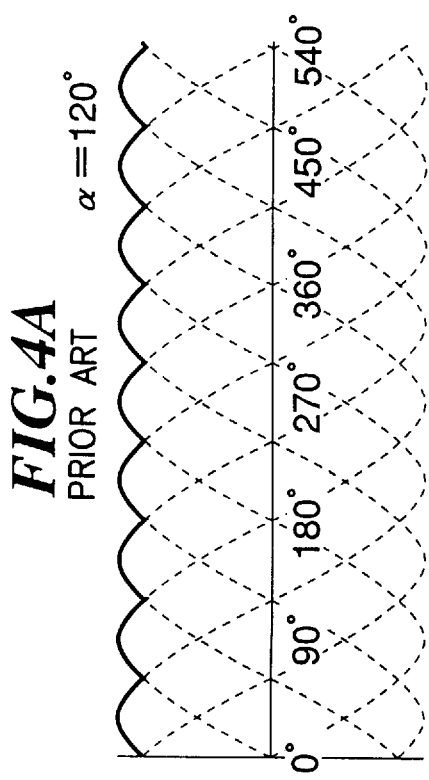
FIG. 4C is a diagram showing an output waveform of a negative converter exhibited when each thyristor thereof is fired at a firing angle of 120°.
Figure 4D:
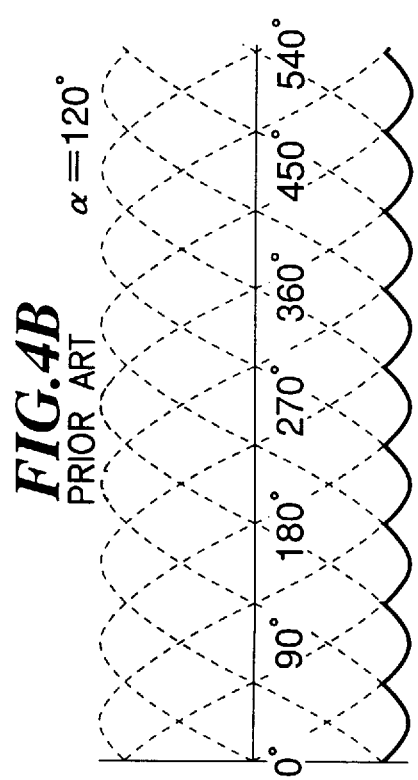
FIG. 4D is a diagram showing an output waveform of the negative converter exhibited when each thyristor thereof is fired at a firing angle of 60°.

The output sides of the three-phase sub coils 2 are connected to a synchronizing signal-forming circuit 18 which may be formed of the three-phase full-wave rectifier FR described hereinbefore with respect to the prior art (FIG. 2). The synchronizing signal-forming circuit 18 forms and delivers sawtooth waves shown in FIG. 10 in response to the three-phase outputs from the three-phase sub coils 2.

Figure 10:
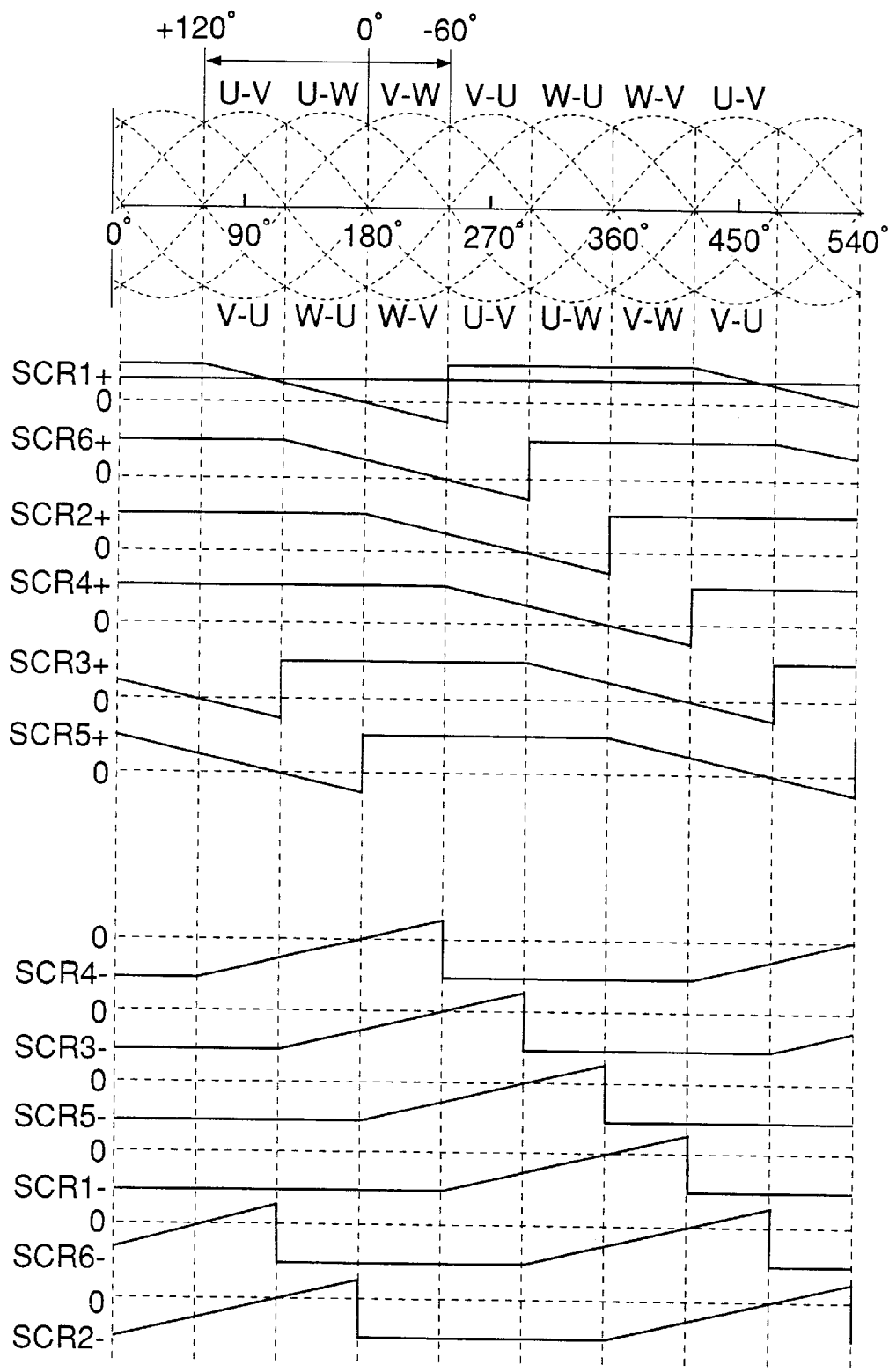
FIG. 10 is a diagram showing reference sawtooth waves generated for controlling the firing angles of the thyristors.

FIG. 10 shows examples of sawtooth waves for controlling the firing angles of the thyristors SCRk± when the controllable range of each firing angle is set to 120° to −60°. These sawtooth waves are different from those described hereinabove with reference to FIG. 5 in that the saw tooth portions have extended lengths. The reason for thus expanding the controllable range of the firing angles of the thyristors SCRk± to a negative side compared with the conventional cycloconverter CC is as follows:

In the conventional cycloconverter CC, if the output voltage thereof is controlled to decrease when a capacitive load is connected to an output terminal thereof and at the same time a positive potential exists on the load side, there occurs a discontinuity in the relationship between the firing angle of each thyristor SCRk± and the output voltage, which makes it impossible to stabilize the output voltage. That is, to decrease the output voltage when a positive potential exists on the load side, it is required to absorb the positive charge on the load side. In the conventional cycloconverter, however, the firing angle α is controlled within the limited range of 120° to 0°, it is impossible for the positive converter BC1 to absorb the positive charge on the load side, and therefore the negative converter BC2 has to absorb it. When the negative converter BC2 absorbs the positive charge, since the output voltage from the negative converter BC2 can change from the negative full-wave rectified voltage to 0 V, the positive charge on the load side suddenly drops to 0 V, causing a discontinuity in the output voltage. If the controllable range of the firing angles is expanded to 120° to −60°, it is possible to absorb the positive charge by the negative converter BC2 such that a positive output voltage is achieved, so that no discontinuity occurs in the output voltage, thereby making it possible to secure stability of the control.

However, if the controllable range is thus expanded to the negative side, as shown in FIG. 11, the output ranges of the positive and negative converters BC1, BC2 overlap with each other, so that there exist two intersecting points TO1 and TO2 between the desired wave r and each sawtooth wave, and hence it is impossible to judge which of the positive and negative converters BC1 and BC2 should be selected for firing the gate of a corresponding one of the thyristors SCRk± thereof. To solve this problem, in the present embodiment, one of the positive and negative converters BC1 and BC2 is selected according to results of the comparison by the comparator 16, as described above.

The output side of the synchronizing signal-forming circuit 18 is connected to the positive gate control device 15a and the negative gate control device 15b. Connection lines between the synchronizing signal-forming circuit 18 and the positive and negative gate control devices 15a, 15b are each formed by six signal lines which are connected to respective corresponding ones of the six comparators of each of the gate control devices 15a and 15b for supplying them with the respective sawtooth waves having extended sawtooth portions described above with reference to FIG. 10 at timing shown in FIG. 10.

The output sides of the six comparators of the positive control device 15a are connected to the gates of respective corresponding ones of the thyristors SCRk+ of the positive converter BC1, while the output sides of the six comparators of the negative control device 15b are connected to the gates of respective corresponding ones of the thyristors SCRk− of the negative converter BC2.

Although in the present embodiment, the synchronizing signal-forming circuit 18 is constructed such that it forms synchronizing signals in response to three-phase outputs from the three-phase sub coils 2, this is not limitative, but a single-phase sub coil may be employed in place of the three-phase sub coils 2 to form a synchronizing signal (reference sawtooth wave) in response to the single-phase output.

Next, the operation of the power unit constructed as above will be described.

As the rotor R is driven for rotation by the engine, voltages are produced between the three-phase output terminals of the three-phase main coils 1 as described above. Then, as the gate of each of the thyristors SCRk± is fired by the firing angle control device 15, the cycloconverter CC delivers electric current, and the filter 3 removes harmonic components from the electric current. The output voltage-detecting circuit 5 detects the voltage of the electric current. The approximate effective value-calculating circuit 8 calculates the approximate effective value of the voltage based on the voltage thus detected and generates a signal indicative of the calculated approximate effective value.

The comparator 9 compares the approximate effective value with the reference voltage value delivered from the reference voltage-generating circuit 10, and the control function-calculating circuit 11 calculates the control function (linear function) based on results of the comparison to deliver the calculated function. More specifically, the control function-calculating circuit 11 calculates the linear function such that a proportional coefficient (constant of proportionality) of the linear function is increased as the difference between the reference voltage value from the reference voltage-generating circuit 10 and the approximate effective value from the approximate effective value-calculating circuit 8 is larger.

The amplitude control circuit 12 generates a control signal for controlling the amplitude of the sinusoidal wave of 50 Hz or 60 Hz delivered from the sinusoidal oscillator 13, based on the control function thus calculated, and the desired wave-forming circuit 14 forms the desired wave based on the control signal and delivers the same. Predetermined upper and lower limit values are provided for the output or control signal from the desired wave-forming circuit 14, and the desired wave-forming circuit 14 is constructed such that it cannot generate a voltage value higher than the upper limit value or lower than the lower limit value. That is, as the output value from the comparator 9 increases so that the proportional coefficient of the linear function from the control function-calculating circuit 11 increases, the shape of the desired wave from the desired wave-forming circuit 14 is changed from a sinusoidal one to a rectangular one.

The comparator 16 compares the desired wave from the desired wave-forming circuit 14 with the output voltage detected by the output voltage-detecting circuit 5. When the former is higher in voltage than the latter, a high level (H) signal is delivered from the comparator 16 to enable the positive gate control device 15a, whereas when the former is lower in voltage than the latter, a low level (L) signal is delivered from the comparator 16 to enable the negative gate control device 15b.

The comparators of a selected one of the positive gate control device 15a and the negative gate control device 15b each compare the desired wave from the desired wave-forming circuit 14 with a corresponding sawtooth wave from the synchronizing signal-forming circuit 18, and when the desired wave agrees with or intersects the sawtooth wave, a one-shot pulse having a predetermined wavelength is delivered from the gate control device 15 to the gate of a corresponding one of the thyristors SCRk± to control the firing angle thereof.

Figure 12A:
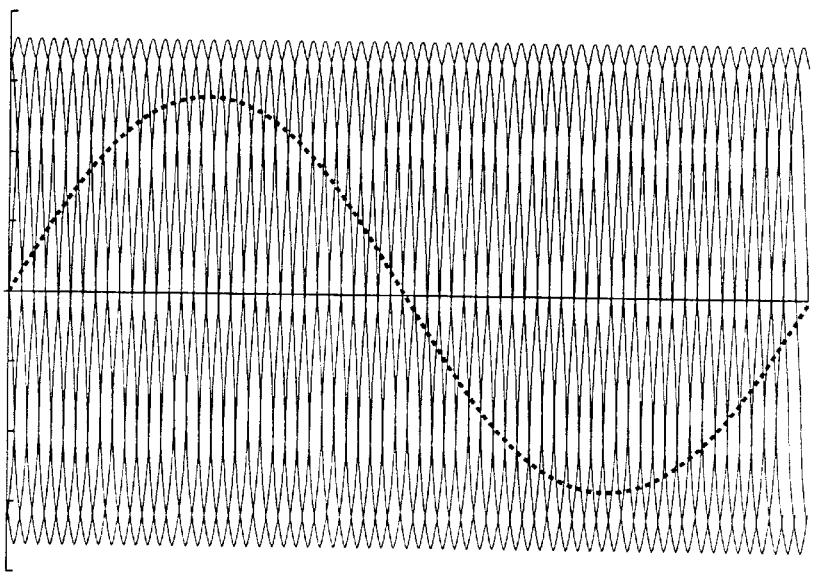
FIGS. 12A to 12C are diagrams showing examples of waveforms of 50 Hz outputs delivered from the FIG. 8 power unit under respective different load conditions.
Figure 12B:
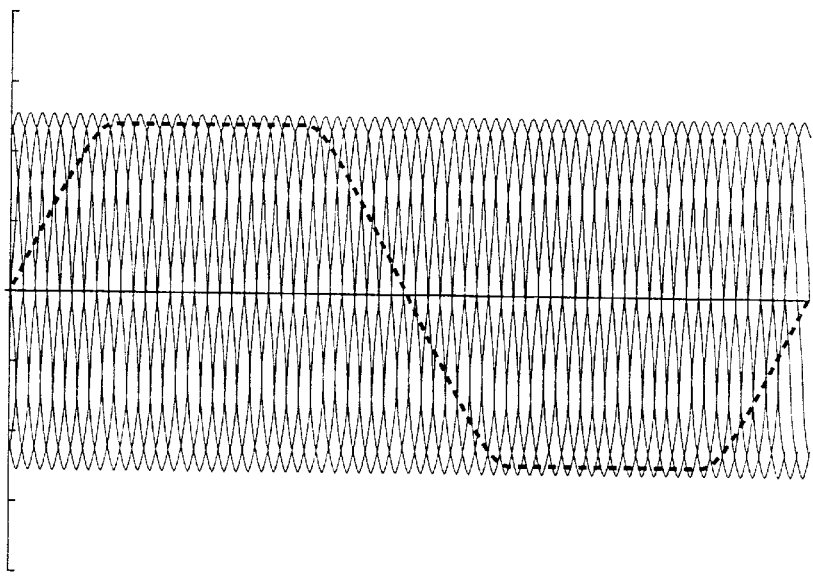
Figure 12C:
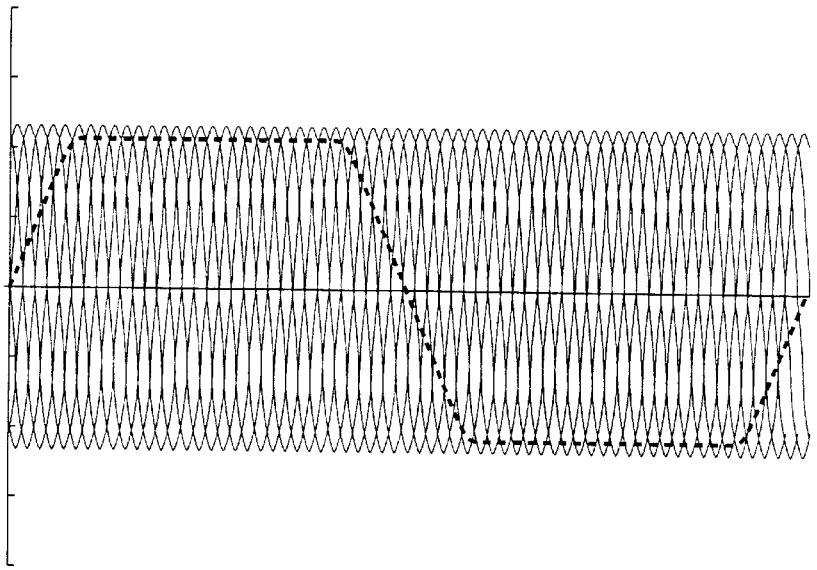

FIGS. 12A to 12C show examples of output waveforms of 50 Hz generated by the power unit of the present embodiment. FIG. 12A shows an output waveform generated when the power unit is under a no-load condition, FIG. 12B an output waveform under a rated load condition, and FIG. 12C an output waveform under an excessive load condition.

As shown in these figures, when an excessive load is applied to the power unit, the output waveform of the cycloconverter is changed from a sinusoidal one to a rectangular one, depending upon the degree of the applied excessive load, i.e. the difference between the reference voltage from the reference voltage-generating circuit 10 and the approximate effective value from the approximate effective value-calculating circuit 8.

Although in the present embodiment, the shape of the desired waveform is changed from a sinusoidal one to a rectangular one according to the load condition, this is not limitative, but when the power unit is constructed such that the output voltage is limited by the maximum amplitude, the amplitude of the desired waveform may be increased according to the load condition.

As described above, according to the present embodiment, the output frequency of the three-phase generator can be controlled to a predetermined frequency by the cycloconverter irrespective of the output frequency of the three-phase generator, that is, the output frequency of the power unit does not depend upon the rotational speed of the drive source, such as an engine, similarly to the inverter generator according to the prior art described above. Therefore, it is possible to obtain a high output from the generator driven by the drive source at a fairly high rotational speed, whereby the generator can be reduced in size and weight.

Further, according to the present embodiment, it is possible to directly convert a high-frequency output of the AC generator to an AC output having a predetermined lower frequency, such as a single-phase commercial frequency, whereby the number of power circuit component parts can be largely reduced, to largely reduce the manufacturing cost.

Furthermore, the use of a magneto generator having multiple poles as the generator largely contributes to reduction of the size and weight of the whole unit, and simplifies the formation of synchronizing signals.

Still further, the rotor R of the generator can be also used as the fly wheel of the engine, which enables designing the whole power unit further compact in size.

Moreover, according to the present embodiment, when the power unit is temporarily heavily loaded, the output from the power unit is automatically increased to a value close to the upper limit of the whole input energy from the generator. As a result, the operation of the power unit can be continued without difficulty even when the power unit is temporarily excessively loaded.

Next, a second embodiment of the present invention will be described with reference to FIGS. 13 to 17. The second embodiment is distinguished from the first embodiment in that the positive converter BC1 has a two-layered structure of an upper converter layer (half-wave converter) BC1U and a lower converter layer (half-wave converter) BC1L, and the negative converter BC2 has a two-layered structure of an upper converter layer BC2U and a lower converter layer BC2L. Further, correspondingly to the two-layered structure of each of the positive and negative converters, the output voltage-detecting circuit 5 is comprised of an upper half-wave converter voltage-detecting circuit 5A, a lower half-wave converter voltage-detecting circuit 5B, and an output voltage-synthesizing circuit 5C, and the firing angle control circuit 15 is comprised of a positive upper gate control device 15A, a negative upper gate control device 15B, a positive lower gate control device 15C, and a negative lower gate control device 15D.

Figure 13:
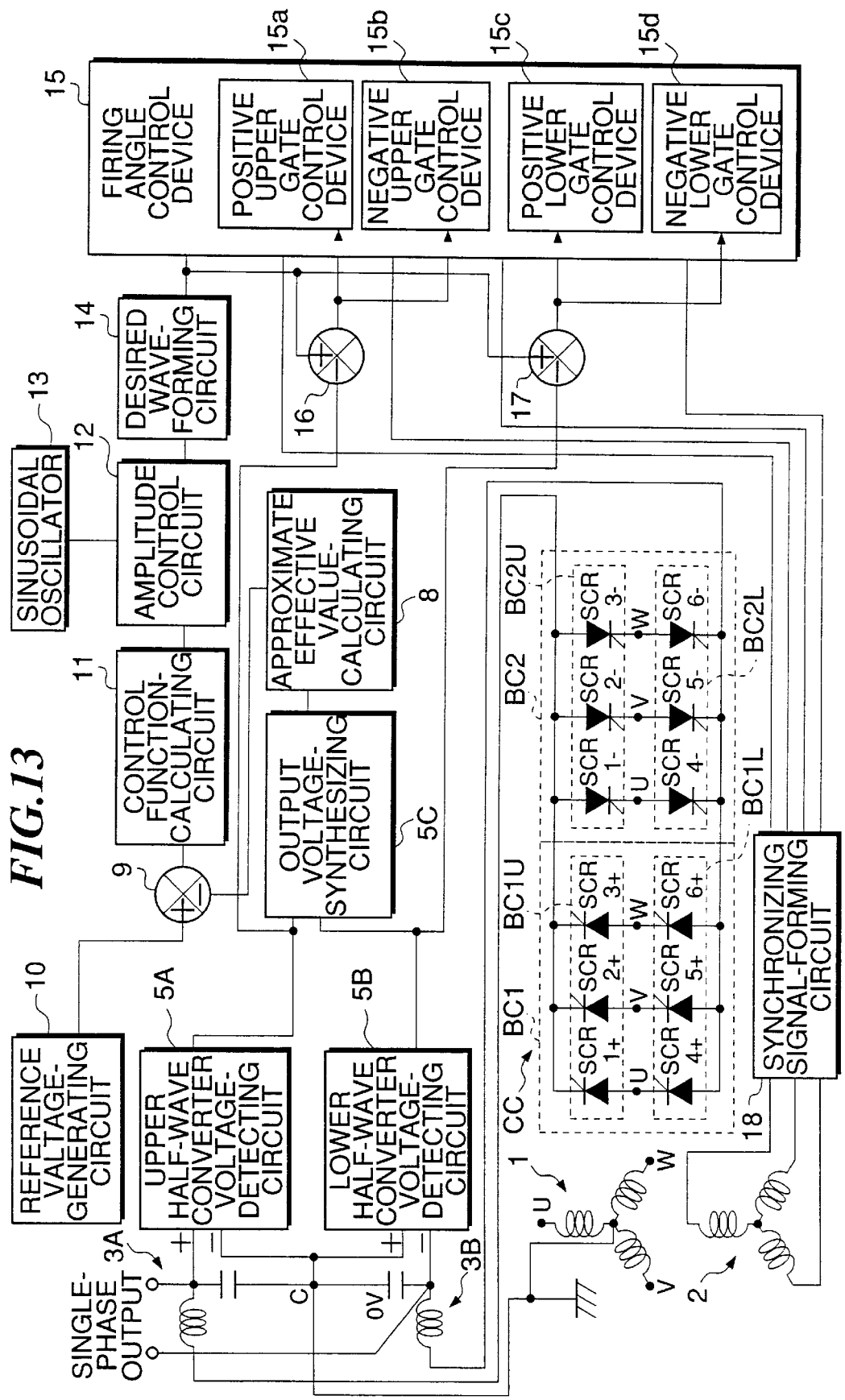
FIG. 13 is a block diagram schematically showing the whole arrangement of a power unit according to a second embodiment of the invention.

FIG. 13 shows the whole arrangement of a power unit according to the second embodiment of the invention. In the figure, the component parts and elements corresponding to those of the first embodiment described hereinabove with reference to FIG. 8 are designated by identical reference numerals, and detailed description thereof is omitted.

As shown in the figure, the three-phase main coils 1 have three output terminals U, V, and W which are connected to respective input terminals U, V and W of each of the positive and negative converters BC1 and BC2. The output side of the cycloconverter CC is connected to an LC filter 3A for removing harmonic components from the half-wave rectified electric current delivered from the upper converter layer BC1U formed of thyristors SCR1+ to SCR3+ of the positive converter BC1 (hereinafter referred to as "the positive upper converter) or the upper converter layer BC2U formed of thyristors SCR1– to SCR3– of the negative converter BC2 (hereinafter referred to as "the negative upper converter), and an LC filter 3B for removing harmonic components from a half-wave rectified electric current delivered from the lower converter layer BC1L formed of thyristors SCR4+ to SCR6+ of the positive converter BC1 (hereinafter referred to as "the positive lower converter) or the lower converter layer BC2L formed of thyristors SCR4– to SCR6– of the negative converter BC2 (hereinafter referred to as "the negative lower converter). A junction C between the LC filters 3A and 3B is connected to a neutral point of the three-phase main coils 1, and the neutral point serves as a ground GND of the present control block.

The output side of the LC filter 3A is connected to the upper half-wave converter voltage-detecting circuit 5A for detecting an output voltage of a half-wave electric current delivered from the LC filter 3A which is free of the harmonic components, while the output side of the LC filter 3B is connected to the lower half-wave converter voltage-detecting circuit 5B for detecting an output voltage of a half-wave electric current delivered from the LC filter 3B which is free of the harmonic components. A single-phase output is obtained from a positive input terminal of the upper half-wave converter voltage-detecting circuit 5A and a negative input terminal of the lower half-wave converter voltage-detecting circuit 5B.

Thus, in the present embodiment, the junction C, i.e. the neutral point formed on a single-phase output side and the neutral point of the three-phase main coils 1 are connected to each other to establish a voltage doubler rectifier connection. Correspondingly to this connection, the positive and negative converters BC1 and BC2 are constituted by respective two-layered structures of the upper converter layer BC1U and the lower converter layer BC1L, and the upper converter layer BC2U and the lower converter layer BC2L.

The voltage-detecting circuits 5A and 5B have respective output sides thereof connected to the output voltage-synthesizing circuit 5C. The output voltage-synthesizing circuit 5C has an output side thereof connected to an approximate effective value-calculating circuit 8, which has an output side thereof connected to a negative input terminal of a comparator 9. The arrangement and connections of parts of the power unit from the comparator 9 to a desired wave-forming circuit 14 of the present embodiment are identical to those of the first embodiment, and description thereof is omitted.

In the present embodiment, the desired wave-forming circuit 14 has an output side thereof connected to the firing angle control device 15 for controlling the firing angles of the gates of the thyristors SCRk± constituting the cycloconverter CC, and positive input terminals of comparators 16, 17.

As mentioned above, the firing angle control device 15 is comprised of the positive upper gate control device 15A for controlling the firing angles of the gates of the thyristors SCR1+ to SCR3+ of the positive upper converter BC1U (hereinafter referred to as "the positive upper gates"), the negative upper gate control device 15B for controlling the firing angles of the gates of the thyristors SCR1– to SCR3– of the negative upper converter BC2U (hereinafter referred to as "the negative upper gates"), the positive lower gate control device 15C for controlling the firing angles of the gates of the thyristors SCR4+ to SCR6+ of the positive lower converter BC1L (hereinafter referred to as "the positive lower gates"), and the negative lower gate control device 15D for controlling the firing angles of the gates of the thyristors SCR4– to SCR6– of the negative lower converter BC2L (hereinafter referred to as "the negative lower gates").

These gate control devices 15a to 15d each have three comparators, not shown, each of which compares the desired wave from the desired wave-forming circuit 14 with the synchronizing signal (reference sawtooth wave), as described with respect to the prior art (FIG. 5), and fires a corresponding one of the gates when the former agrees with the latter.

The comparator 16 has a negative input terminal thereof connected to the output side of the upper half-wave converter voltage-detecting circuit 5A, while the comparator 17 has a negative input terminal thereof connected to the output side of the lower half-wave converter voltage-detecting circuit 5B. The output side of the comparator 16 is connected to the positive upper gate control device 15A and the negative upper gate control device 15B, while the output side of the comparator 17 is connected to the positive lower gate control device 15C and the negative lower gate control device 15D. The comparator 16 compares the voltage from the upper half-wave converter voltage-detecting circuit 5A with the desired wave, and selectively delivers a high (H) level signal and a low (L) level signal depending upon results of the comparison. Similarly, the comparator 17 compares the voltage from the lower half-wave converter voltage-detecting circuit 5B with the desired wave, and selectively delivers a high (H) level signal and a low (L) level signal depending upon results of the comparison.

When the H level signal is delivered from the comparator 16, the positive upper gate control device 15A is enabled, while the negative upper gate control device 15B is disabled. On the other hand, when the L level signal is delivered from the same, the positive upper gate control device 15A is disabled, while the negative upper gate control 15B is enabled. Similarly, when the H level signal is delivered from the comparator 17, the positive lower gate control device 15C is enabled, while the negative lower layer gate control device 15D is disabled. On the other hand, when the L level signal is delivered from the same, the positive lower layer gate control device 15C is disabled, while the negative lower layer gate control 15D is enabled.

The output terminals of the three-phase sub coils 2 are connected to a synchronizing signal-forming circuit 18 which may be formed of the three-phase full-wave rectifier FR in FIG. 2 similarly to the first embodiment described hereinbefore. The synchronizing signal-forming circuit 18 forms and delivers sawtooth waves shown in FIGS. 14A to 15B in response to the three-phase outputs from the three-phase sub coils 2.

Figure 14A:
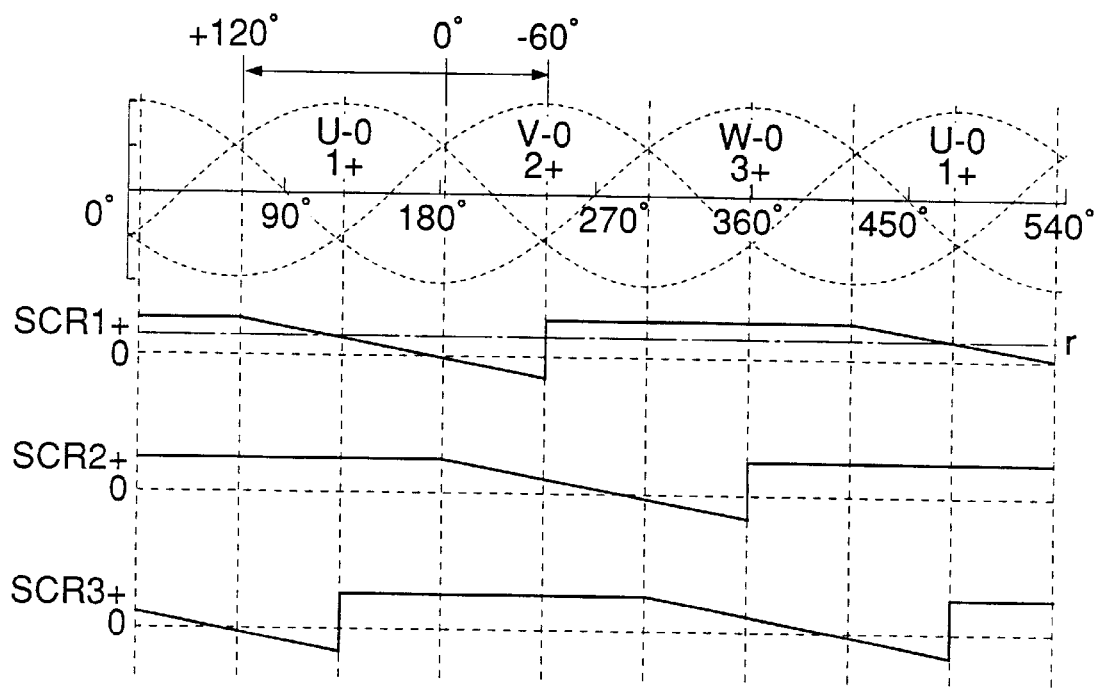
FIG. 14A is a diagram showing reference sawtooth waves generated for controlling the firing angles of thyristors SCRk+ of a positive upper converter.
Figure 14B:
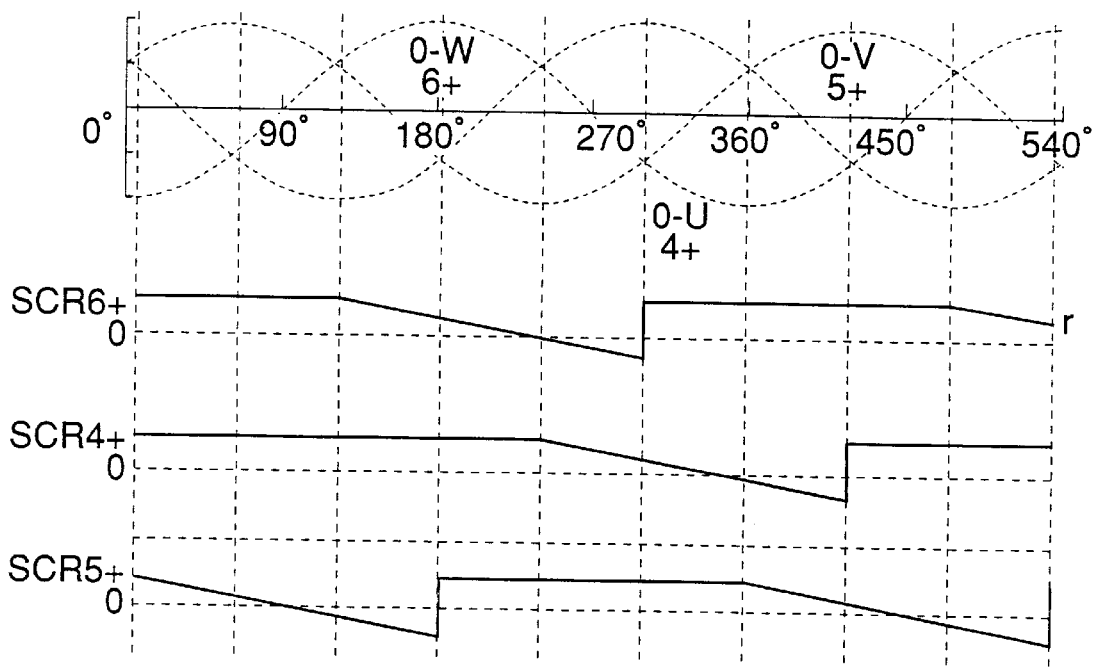
FIG. 14B is a diagram showing reference sawtooth waves generated for controlling the firing angles of thyristors SCRk+ of a positive lower converter.

FIGS. 14A and 14B show examples of sawtooth waves for controlling the firing angles of the thyristors SCRk+ of the positive converter BC1. FIG. 14A shows sawtooth waves for controlling the firing angles of the thyristors SCR1+ to SCR3+ of the positive upper converter BC1U, while FIG. 14B shows sawtooth waves for controlling the firing angles of the thyristors SCR4+ to SCR6+ of the positive lower converter BC1L.

Figure 15A:
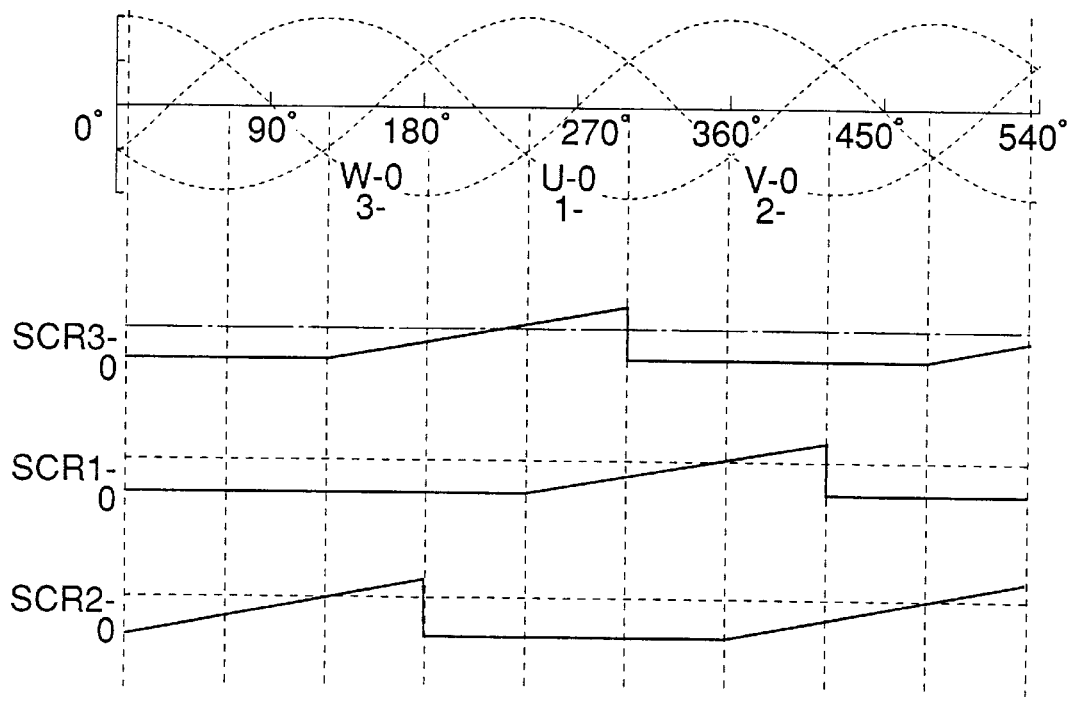
FIG. 15A is a diagram showing reference sawtooth waves generated for controlling the firing angles of thyristors SCRk− of a negative upper converter.
Figure 15B:
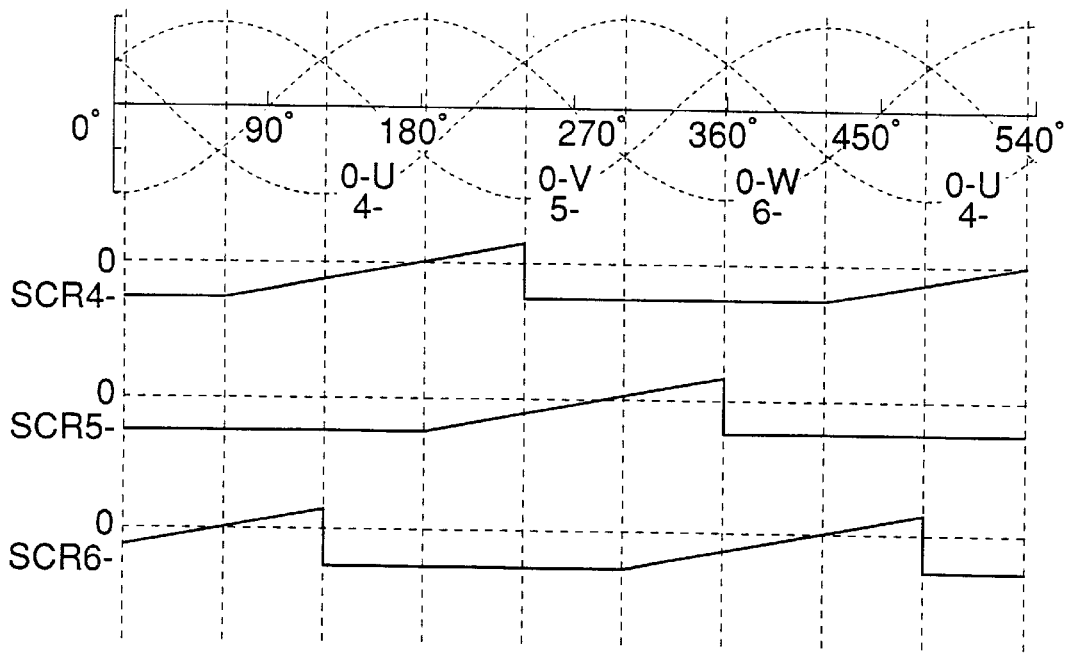
FIG. 15B is a diagram showing reference sawtooth waves generated for controlling the firing angles of thyristors SCRk− of a negative lower converter.

On the other hand, FIGS. 15A and 15B show examples of sawtooth waves for controlling the firing angles of the thyristors SCRk− of the negative converter BC1. FIG. 14A shows sawtooth waves for controlling the firing angles of the thyristors SCR1− to SCR3− of the negative upper converter BC2U, while FIG. 15B shows sawtooth waves for controlling the firing angles of the thyristors SCR4− to SCR6− of the negative lower converter BC2L.

Figure 5:
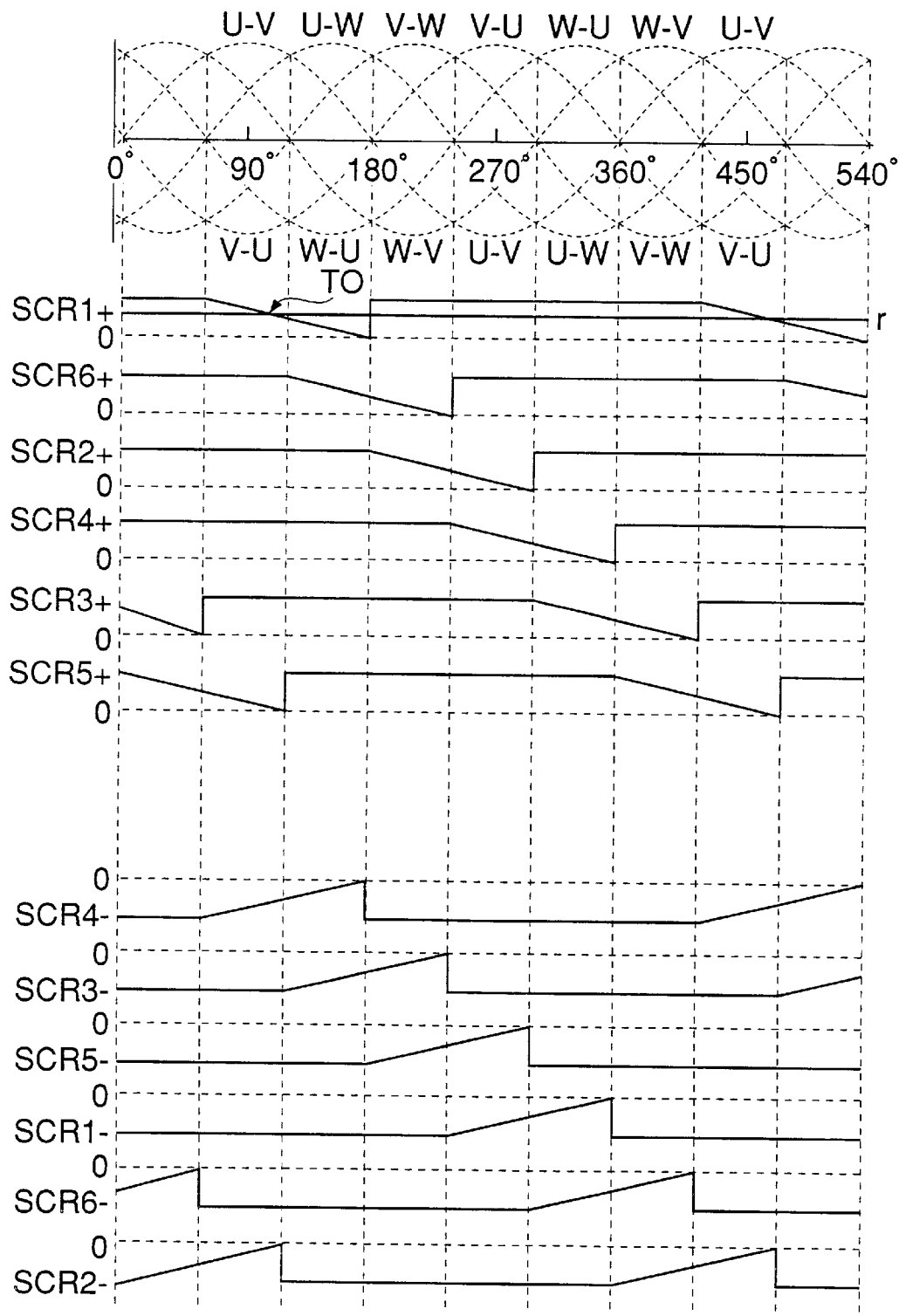
FIG. 5 is a diagram showing reference sawtooth waves generated for controlling the firing angles of thyristors.
Figure 6:
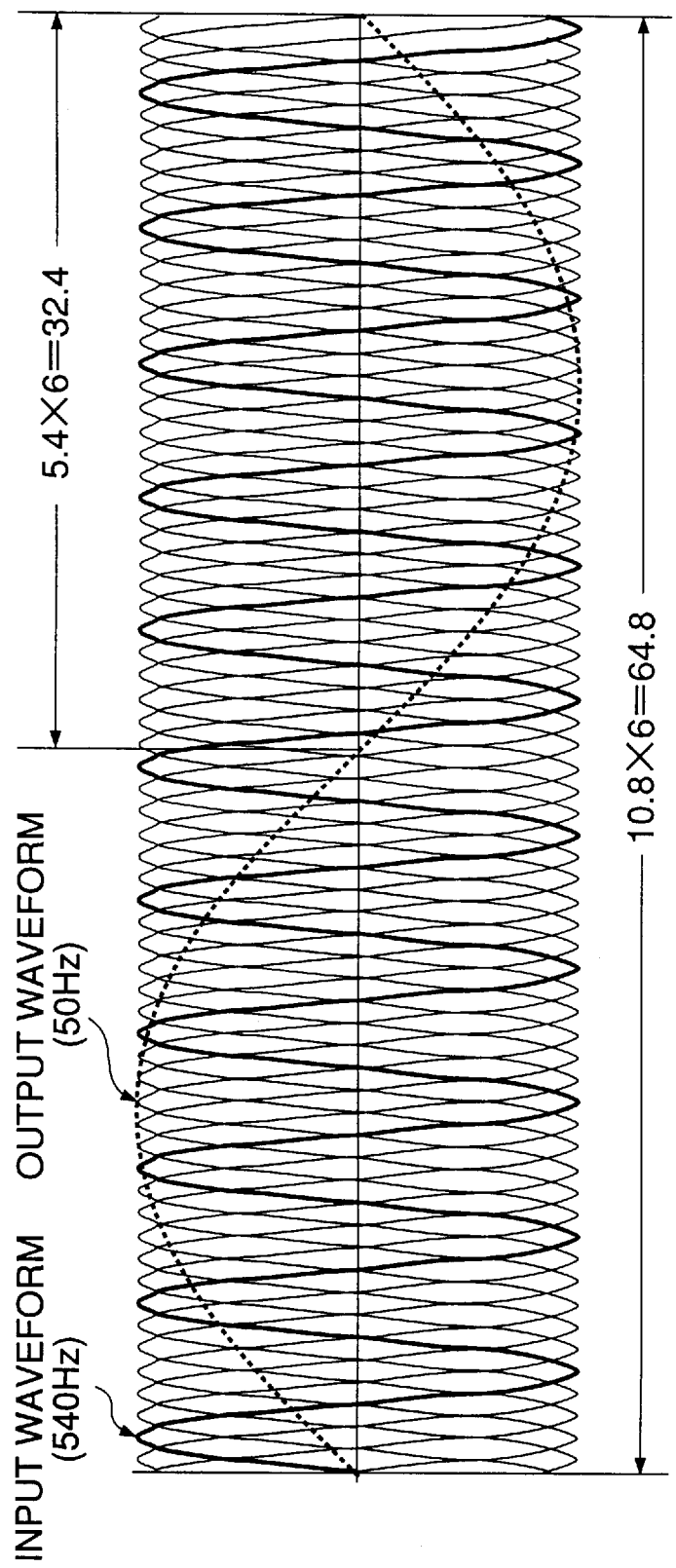
FIG. 6 is a diagram showing a sinusoidal wave of 50 Hz generated by the FIG. 1 cycloconverter.
Figure 7:
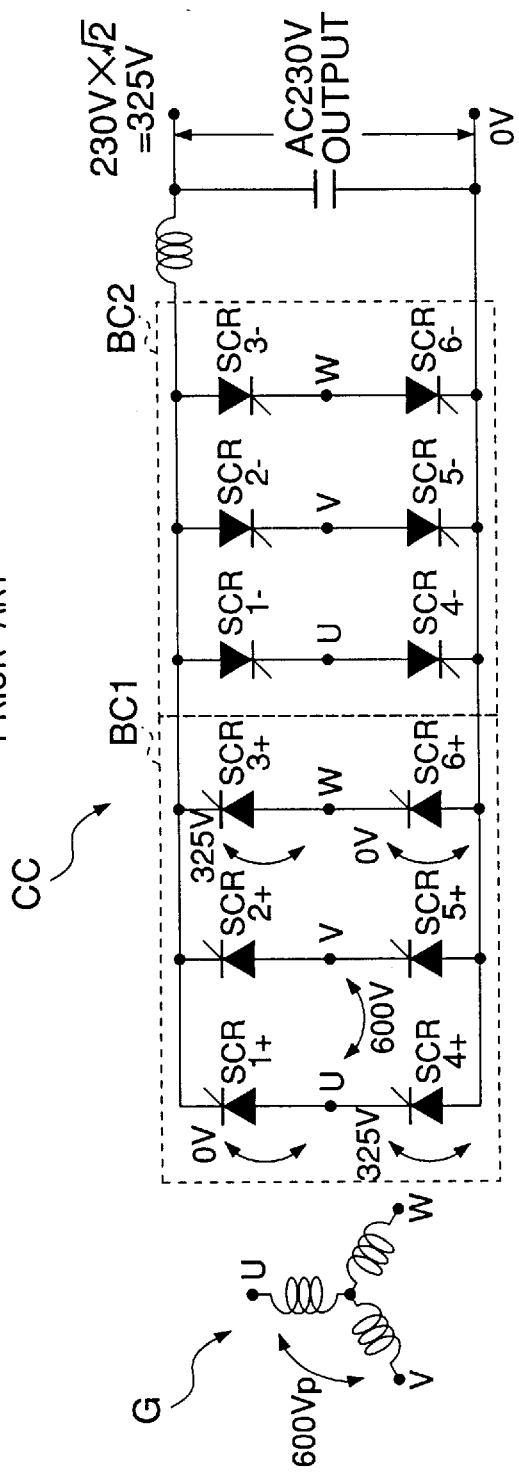
FIG. 7 is a diagram showing voltages applied to the thyristors, when an AC 230 V output is obtained from the FIG. 1 cycloconverter.

The sawtooth waves shown in FIGS. 14A to 15B are different from those described hereinabove with reference to FIG. 5 in that the saw tooth portions have respective extended lengths i.e. the controllable range of the firing angles is expanded to a range of 120° to −60°. The reason for thus expanding the controllable range of the firing angles of the thyristors SCRk± to a negative side compared with the conventional cycloconverter CC is the same as described above.

If the controllable range is thus expanded to the negative side, as shown in FIGS. 14A to 15B, there arises the problem as described above with reference to FIG. 11. Therefore, in the present embodiment, according to results of the comparison by the comparators 16, 17, one of the positive and negative converters BC1 and BC2 is selected.

The output side of the synchronizing signal-forming circuit 18 is connected to the positive upper gate control device 15A, the negative upper gate control device 15B, the positive lower gate control device 15C and the negative lower gate control device 15D. Connection lines between the synchronizing signal-forming circuit 18 and the gate control devices 15A to 15D are each formed by three signal lines ends of which are connected to respective corresponding ones of the comparators of the gate control devices 15A to 15D for supplying them with respective three sawtooth waves having extended sawtooth portions described above with reference to FIGS. 14A to 15B. That is, the three sawtooth waves having extended sawtooth portions as shown in each of FIGS. 14A and 14B are supplied to respective corresponding ones of the comparators of the positive upper gate control device 15A and the positive lower gate control device 15C at timing shown in each of FIGS. 14A and 14B, while the three sawtooth waves having extended sawtooth portions as shown in each of FIGS. 15A and 15B are supplied to respective corresponding ones of the comparators of the negative upper gate control device 15B and the negative lower gate control device 15D at timing shown in each of FIGS. 15A and 15B.

The output sides of the three comparators of the positive upper control device 15A are connected to the gates of respective corresponding ones of the thyristors SCR1+ to SCR3+ of the positive upper converter BC1U, the output sides of the three comparators of the negative upper control device 15B to the gates of respective corresponding ones of the thyristors SCR1− to SCR3− of the negative upper converter BC2U, the output sides of the three comparators of the positive lower control device 15C to respective corresponding ones of the gates of the thyristors SCR4+ to SCR4+ of the positive lower converter BC1L, and the output sides of the three comparators of the negative lower control device 15D to respective corresponding ones of the gates of the thyristors SCR4− to SCR6− of the negative lower converter BC2.

Next, the operation of the power unit constructed as above will be described.

As the rotor R is driven for rotation by the engine, voltages are produced between the three-phase output terminals of the three-phase main coils 1 as described above. Then, as the gate of each of the thyristors SCRk± is fired by the firing angle control device 15, the cycloconverter CC delivers two half-wave rectified currents which are obtained by connecting the neutral point of the three-phase main coils 1 to the ground GND, and the filters 3A and 3B remove harmonic components from the two half-wave rectified currents. The upper and lower half-wave converter voltage-detecting circuits 5A and 5B detect the voltages of the half-wave rectified electric currents, which are added together by the output voltage-synthesizing circuit 5C. The approximate effective value-calculating circuit 8 calculates the approximate effective value of the cycloconverter output voltage based on the voltage thus synthesized, and generates a signal indicative of the calculated approximate effective value.

The comparator 9 compares the approximate effective value with the reference voltage value delivered from the reference voltage-generating circuit 10, and the control function-calculating circuit 11 calculates the control function (linear function) based on results of the comparison. Based on the control function thus calculated, the amplitude control circuit 12 controls the amplitude of the sinusoidal wave of 50 Hz or 60 Hz delivered from the sinusoidal oscillator 13, to generate a control signal, and the desired wave-forming circuit 14 generates the desired wave (sinusoidal wave) based on the control signal. That is, the amplitude of the desired wave is adjusted to a value not largely different from the amplitude of the sawtooth waves delivered from the synchronizing signal-forming circuit 18.

The comparator 16 compares the desired wave from the desired wave-forming circuit 14 with the output voltage detected by the upper layer half-wave converter voltage-detecting circuit 5A, and when the former is higher in voltage than the latter, a high (H) level signal is delivered from the comparator 16 to enable the positive upper gate control device 15A, whereas when the former is lower in voltage than the latter, a low (L) level signal is delivered from the comparator 16 to enable the negative upper gate control device 15B. Similarly, the comparator 17 compares the desired wave with the output voltage detected by the lower half-wave converter voltage-detecting circuit 5B, and when the former is higher in voltage than the latter, a high (H) level signal is delivered from the comparator 17 to enable the positive lower gate control device 15C, whereas when the former is lower in voltage than the latter, a low (L) level signal is delivered from the comparator 17 to enable the negative lower gate control device 15D.

The comparators of a selected one of the positive upper gate control device 15A and the negative upper gate control device 15B and those of a selected one of the positive lower gate control device 15C and the negative lower gate control device 15D each compare the desired wave from the desired wave-forming circuit 14 with respective sawtooth waves from the synchronizing signal-forming circuit 18, and when the desired wave agrees with the sawtooth wave, a one-shot pulse having a predetermined wavelength is delivered from the gate control device 15 to the gate of a corresponding one of the thyristor SCRk± to thereby control the firing angle thereof.

Figure 16A:
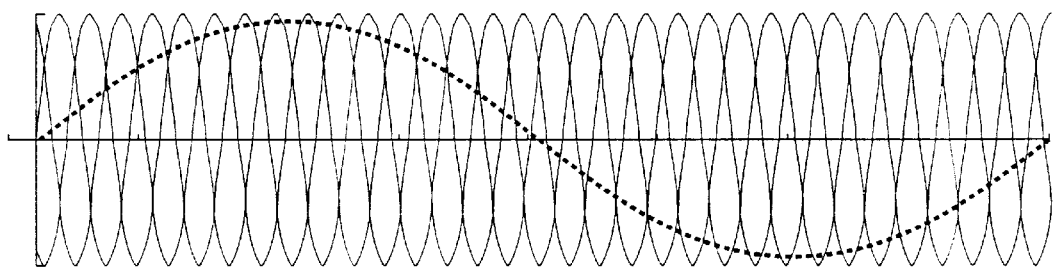
FIG. 16A is a diagram showing an output voltage waveform of an upper (half-wave) converter of the FIG. 13 power unit.
Figure 16B:
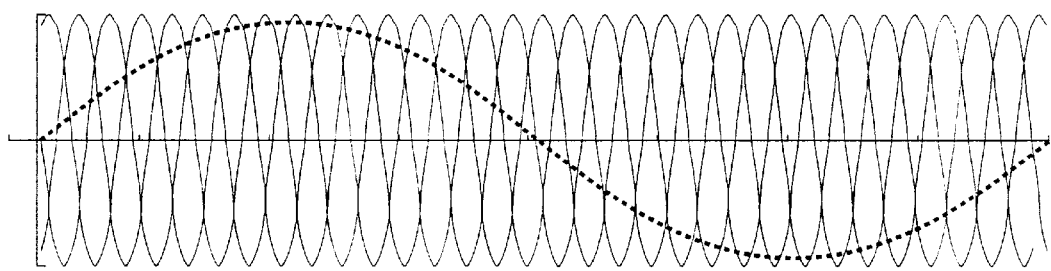
FIG. 16B is a diagram showing an output voltage waveform of a lower (half-wave) converter of the FIG. 13 power unit.
Figure 16C:
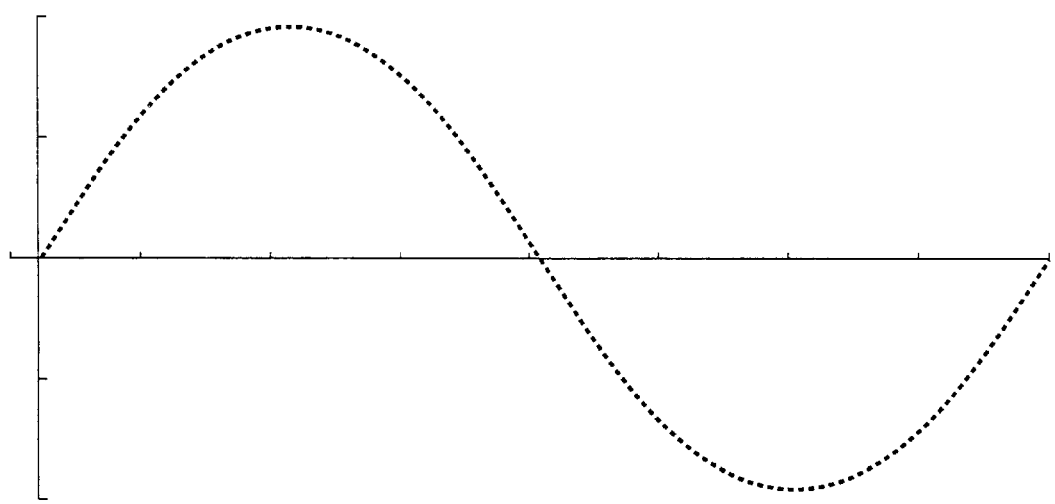
FIG. 16C is a diagram showing a synthesized output voltage waveform of the upper and lower (half-wave) converters.

FIGS. 16A to 16C show examples of output waveforms generated by the power unit of the present embodiment. FIG. 16A shows an output waveform formed by the upper (half-wave) converters BC1U and BC2U, and FIG. 16B shows an output waveform formed by the lower (half-wave) converters BC1L and BC2L, while FIG. 16C shows an output waveform formed by synthesizing the FIGS. 16A and 16B waveforms, i.e. a waveform of the output voltage of the power unit of the present embodiment.

Thus, according to the present embodiment, the upper (half-wave) converters BC1U and BC2U form a waveform having half the amplitude of the FIG. 16C single-phase output waveform, while the lower (half-wave) converters BC1L and BC2L form a waveform having half the amplitude of the FIG. 16C single-phase output waveform. These waveforms are synthesized i.e. added together, and supplied to the load as the single-phase output. The manner of forming the FIG. 16A waveform and the FIG. 16B waveform is the same as described hereinabove with reference to FIGS. 1 to 6, and hence description thereof is omitted.

Figure 17:
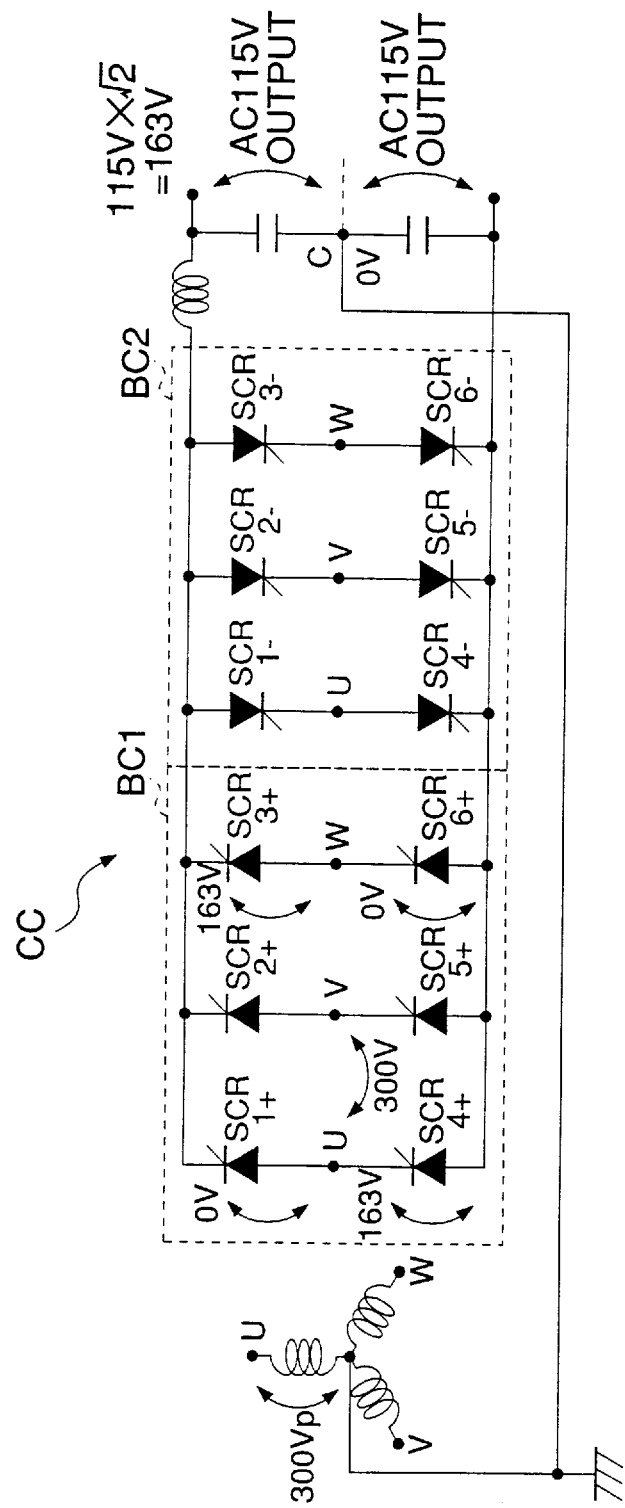
FIG. 17 is a diagram showing voltages applied to the thyristors, when an AC 230 V output is obtained from the FIG. 13 cycloconverter.

FIG. 17 shows voltages applied to the thyristors SCRk±, when a 230V alternating current output is generated from the cycloconverter CC. Similarly to FIG. 7, assuming that the thyristors SCR1+ and SCR6+ are turned on in pair, and the output voltage assumes a peak value of AC 230 V, the voltage Vscr applied to the thyristor SCR5+ can be calculated by the following equation:

Vscr=115×√2V1 Vp+300 Vp=463V

Small-sized thyristors currently available include ones having a withstand voltage of approximately 600V. Therefore, even if the cycloconverter is formed by such small-sized thyristors, it is possible to obtain AC 230 V power from the cycloconverter.

As described above, according to the present embodiment, the neutral point formed on the single-phase output side and the neutral point of the three-phase main coils 1 are connected to each other to establish the voltage doubler rectifier connection, and the positive and negative converters BC1 and BC2 are constituted by respective two-layered structures of the positive upper converter BC1U and the positive lower converter BC1L, and the negative upper converter BC2U and the negative lower converter BC2L. Therefore, even if a small output power generator which generates several hundreds to several thousands KW is connected to the input side of the cycloconverter, it is possible to control the voltage applied to the thyristors SCRk± to a low value even when the line-to line voltage rises under a no-load condition of the power unit. This permits the use of small-sized thyristors having lower withstand voltages.

Further, the present embodiment is more advantageous particularly when a magneto generator is employed as the AC generator, since the voltage increase under a no-load condition of the power unit is particularly large when a magneto generator is employed.

What is claimed is:

1. A portable power unit comprising:
   a magneto generator having three-phase output windings;
   a synchronizing signal-forming circuit for forming a synchronizing signal in synchronism with an output frequency of said magneto generator;
   a pair of variable control bridge circuits connected to said three-phase output windings and connected in an antiparallel manner to each other to form a cycloconverter for generating a single-phase alternating current to be supplied to a load, said single-phase alternating current having a desired frequency;
   a bridge drive circuit responsive to said synchronizing signal from said synchronizing signal-forming circuit, for causing said pair of variable control bridge circuits to be alternately switched to operate every half a repetition period of said single-phase alternating current, to thereby cause said cycloconverter to generate said single-phase alternating current;
   an output voltage-detecting circuit for detecting an output voltage of said pair of variable control bridge circuits; and
   an output voltage-adjusting circuit for comparing said output voltage detected by said output voltage-detecting circuit with a desired voltage, and for controlling said bridge drive circuit based on said comparison in a manner such that said output voltage of said pair of variable control bridge circuits is stabilized.

2. A portable power unit according to claim 1, wherein said magneto generator comprises:
   a magnet rotor, a stator having a plurality of magnet poles, said magnet poles including a first set of magnet poles around which said three-phase output windings are wound, and a second set of magnet poles, and
   signal windings wound around said second set of magnet poles, said signal windings being coupled to said synchronizing signal-forming circuit.

3. A portable power unit according to claim 2, wherein said magneto generator is driven by an internal combustion engine which utilizes said magnet rotor as a fly wheel.

4. A portable power unit comprising:
   a magneto generator having three-phase output windings;
   a pair of variable control bridge circuits connected to said three-phase output windings and connected in an antiparallel manner to each other to form a cycloconverter for generating a single-phase alternating current to be supplied to a load, said single-phase alternating current having a desired frequency;
   a bridge drive circuit for causing said pair of variable control bridge circuits to be alternately switched to operate every half a repetition period of said single-phase alternating current, to thereby cause said cycloconverter to generate said single-phase alternating current;

an output voltage-detecting circuit for detecting an output voltage of said pair of variable control bridge circuits; and waveform-forming means for forming a waveform of said output voltage of said pair of variable control bridge circuits in a manner such that said waveform changes from a sinusoidal waveform to a rectangular waveform whose maximum amplitude is limited by said output voltage of said set of variable control bridge circuits, as said load increases.

5. A portable power unit according to claim 4, wherein said magneto generator comprises a magnet rotor and a stator having a plurality of magnet poles, said magneto generator being driven by an internal combustion engine which utilizes said magnet rotor as a fly wheel.

6. A portable power unit comprising:

a magneto generator having three-phase output windings;

a pair of variable control bridge circuits connected to said three-phase output windings and connected in an antiparallel manner to each other to form a cycloconverter for generating a single-phase alternating current to be supplied to a load, said single-phase alternating current having a desired frequency;

a bridge drive circuit for causing said pair of variable control bridge circuits to be alternately switched to operate every half a repetition period of said single-phase alternating current, to thereby cause said cycloconverter to generate said single-phase alternating current; and desired waveform-forming means for forming a desired waveform of a drive signal for operating said pair of variable control bridge circuits to generate said single-phase alternating current, in a manner such that said desired waveform changes from a sinusoidal waveform to a rectangular waveform as said load increases.

7. A portable drive unit according to claim 6, wherein said desired wave-forming means changes an amplitude of said desired waveform based on a of comparison of an output voltage of said cycloconverter to a set voltage, and changes said desired waveform from said sinusoidal waveform to said rectangular waveform by limiting said amplitude of said desired waveform to a predetermined upper limit and a predetermined lower limit.

8. A portable power unit according to claim 7, wherein said magneto generator comprises a magnet rotor and a stator having a plurality of magnet poles, said magneto generator being driven by an internal combustion engine which utilizes said magnet rotor as a fly wheel.

9. A portable power unit comprising:

a magneto generator having three-phase output windings, said three-phase output windings having a neutral point;

a synchronizing signal-forming circuit for forming a synchronizing signal in synchronism with an output frequency of said magneto generator;

a pair of variable control bridge circuits connected to said three-phase output windings and connected in an antiparallel manner to each other to form a cycloconverter for generating a single-phase alternating current to be supplied to a load, said single-phase alternating current, said cycloconverter having an output for outputting a single-phase alternating current, said output of said cycloconverter having a neutral point, said pair of variable control bridge circuits each having a two-layered structure of two half-wave converters, said neutral point of said output of said cycloconverter being connected to said neutral point of said three-phase output windings such that said pair of variable control bridge circuits operate as a voltage doubler rectifier; and a bridge drive for causing said pair of variable control bridge circuits to be alternately switched to operate every half a repetition period of said single-phase alternating current, to thereby cause said cycloconverter to generate said single-phase alternating current.

10. A portable power unit according to claim 9, including control means for comparing waveforms of output voltages of said two half-wave converters of said pair of variable control bridge circuits with respective desired waveforms, to thereby control said two half-wave converters such that said waveforms of said output voltages of said two half-wave converters become close to said respective desired waveforms.

11. A portable power unit according to claim 10, wherein said magneto generator comprises a magnet rotor and a stator having a plurality of magnet poles, said magneto generator being driven by an internal combustion engine which utilizes said magnet rotor as a fly wheel.

* * * * *